(12) United States Patent
Björkegren et al.

(10) Patent No.: US 11,706,003 B2
(45) Date of Patent: *Jul. 18, 2023

(54) METHODS AND APPARATUSES FOR DOWNLINK TRACKING REFERENCE SIGNAL CONFIGURATION

(71) Applicant: Telefonaktiebolaget LM Ericsson (publ), Stockholm (SE)

(72) Inventors: Håkan Björkegren, Täby (SE); Per Ernström, Stockholm (SE); Mattias Frenne, Uppsala (SE); Stephen Grant, Pleasanton, CA (US); Karl Werner, Segeltorp (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 16 days.

This patent is subject to a terminal disclaimer.

(21) Appl. No.: 17/321,066

(22) Filed: May 14, 2021

(65) Prior Publication Data
US 2021/0273761 A1    Sep. 2, 2021

Related U.S. Application Data

(63) Continuation of application No. 16/193,158, filed on Nov. 16, 2018, now Pat. No. 11,032,043.
(Continued)

(51) Int. Cl.
*H04W 76/27* (2018.01)
*H04W 56/00* (2009.01)
(Continued)

(52) U.S. Cl.
CPC ......... *H04L 5/0048* (2013.01); *H04W 56/001* (2013.01); *H04W 76/27* (2018.02); *H04L 5/0053* (2013.01); *H04L 27/2613* (2013.01)

(58) Field of Classification Search
CPC ..... H04W 76/27; H04L 5/0053; H04L 5/0048
(Continued)

(56) References Cited

U.S. PATENT DOCUMENTS 9,107,213 B2   8/2015 Ng et al.
9,614,653 B2   4/2017 Kim et al.
(Continued)

FOREIGN PATENT DOCUMENTS

CN   102783061 A   11/2012
CN   104956611 A    9/2015
(Continued)

OTHER PUBLICATIONS

3GPP TSG-RAN WG1 #91 R1-1720745; Title: Remaining details on TRS; Source: Ericsson; Agenda Item: 7.2.3.3; Document for: Discussion and Decision; Location and Date: Reno, U.S. Nov. 27-Dec. 1, 2017, consisting ol 27-pages.
(Continued)

*Primary Examiner* — Angel T Brockman
(74) *Attorney, Agent, or Firm* — Christopher & Weisberg, P.A.

(57) ABSTRACT

A method, wireless device and network node are disclosed. According to one aspect, a method for a wireless device includes receiving a configuration of a reference signal resource set from the network node, the reference signal resource set being a set of single-symbol and single antenna port reference signal resources in at least one slot; and based on at least one parameter of the received configuration, determining whether the UE can assume a same antenna port for all reference signal resources of the reference signal resource set.

15 Claims, 15 Drawing Sheets

Related U.S. Application Data

(60) Provisional application No. 62/588,048, filed on Nov. 17, 2017.

(51) Int. Cl.
  *H04L 5/00* (2006.01)
  *H04L 27/26* (2006.01)

(58) Field of Classification Search
  USPC .......................................................... 370/252
  See application file for complete search history.

(56) References Cited

U.S. PATENT DOCUMENTS

| | | | |
|---|---|---|---|
| 9,924,478 | B2 | 3/2018 | Seo et al. |
| 2012/0320833 | A1 | 12/2012 | Yamamoto et al. |
| 2013/0114535 | A1 | 5/2013 | Ng et al. |
| 2013/0258973 | A1 | 10/2013 | Khoshnevis et al. |
| 2013/0272250 | A1 | 10/2013 | Shimezawa et al. |
| 2013/0343300 | A1* | 12/2013 | Kim ................ H04L 5/0048 370/329 |
| 2014/0112290 | A1 | 4/2014 | Chun et al. |
| 2015/0003356 | A1 | 1/2015 | Seo et al. |
| 2015/0139113 | A1 | 5/2015 | You et al. |
| 2019/0058517 | A1 | 2/2019 | Kang et al. |

FOREIGN PATENT DOCUMENTS

| | | |
|---|---|---|
| CN | 106416377 A | 2/2017 |
| EP | 3462664 A1 | 3/2019 |
| JP | 2014531867 A | 11/2014 |
| JP | 2015520982 A | 7/2015 |
| KR | 20160051740 A | 5/2016 |

OTHER PUBLICATIONS

Japanese Office Action and English machine Translation, dated Dec. 23, 2021 for Japanese Application No. 2020522903, consisting of 6 pages.
3GPP TSG RAN WG1 NR Ad Hoc Meeting R1-1709946; Title: CSI-RS design in NR; Agenda Item: 5.1.2.4.2; Source: Huawei, HiSilicon; Document for: Discussion and decision; Date and Location: Jun. 27-30, 2017, Qingdao, China; consisting of 6 pages.
Indian Hearing Notice in Reference of Application No. 201917012710 dated Jan. 23, 2023, consisting of 2 pages.
European Examination Report dated Nov. 29, 2019 issued in corresponding European Patent Application No. 18 808 130.1, consisting of 4 pages.
Korean Notice of Allowance and English Translation dated Sep. 1, 2020 for Application No. 10-2020-7016422, consisting of 14-pages.
3GPP TSG RAN WG1 Meeting #90 R1-1712310; Title: Discussion on fine time/frequency tracking of channel; Source: ZTE; Agenda Item: 6.1.2.3.6; Document for: Discussion and Decision; Location and Date: Prague, Czechia Aug. 21-25, 2017, consisting of 4-pages.
3GPP TSG RAN WG1 Meeting #90 R1-1715116; Title: WF on PTRS pod; Source: ZTE, vivo, LG Electronics, NEC, ASTRI; Agenda Item: 6.1.2.3.4; Location and Date: Prague, Czechia Aug. 21-25, 2017, consisting of 4-pages.
3GPP TSG RAN WG1 Meeting 90bis R1-1717436; Title: Remaining details on TRS ; Source: ZTE, Sanechips; Agenda Item: 7.2.3.6; Document for: Discussion and Decision; Location and Date: Prague, CZ, Oct. 9-13, 2017, consisting of 3-pages.
Indian Examination Report dated Oct. 27, 2020 for International Application No. 201917012710, consisting of 6-pages.
Chinese Office Action and English Translation and Search Report dated Nov. 4, 2020 for Application No. 201880074347.7, consisting of 7-pages.
Japanese Office Action and English Summary dated Nov. 30, 2020 for Japanese Application No. 2020522903, consisting of 10-pages.
3GPP TSG-RAN WG1 Meeting Ad hoc#3 R1-1716753; Title: Summary on TRS remaining issues; Agenda Item: 6.2.3.6; Source: MediaTek Inc.; Document for: Discussion; Date and Location: Sep. 18-21, 2017, Nagoya, Japan, consisting of 38-pages.
3GPP TSG RAN WG1 Meeting 90bis R1-1717949; Title: Discussion on fine time/frequency tracking of channel; Agenda Item: 7.2.3.6; Source: LG Electronics; Document for: Discussion and Decision; Date and Location: Oct. 9-13, 2017, consisting of 5-pages.
International Search Report and Written Opinion dated Feb. 15, 2019 for International Application No. PCT/SE2018/051182 filed on Nov. 16, 2018, consisting of 5-pages.
3GPP TSG-RAN WG1 #91 R1-1720745; Title: Remaining details on TRS; Source: Ericsson; Agenda Item: 7.2.3.3; Document for: Discussion and Decision; Location and Date: Reno, U.S. Nov. 27-Dec. 1, 2017, consisting of 27-pages.
Korean Notice of Preliminary Rejection and English Translation, dated Jun. 22, 2020, for Patent Application No. 2020-7016422, consisting of 8-pages.
3GPP TSG RAN WG1 NR Ad Hoc Meeting R1-1710538, Title: "Discussion on TRS"; Agenda Item: 5.1.2.4.7; Source: Intel Corporation; Document for: Discussion and Decision; Location and Date: Qingdao, China, Jun. 27-30, 2017, Consisting of 7-pages.
3GPP TSG RAN WG1 Meeting #90 R1-1712248, Title: "CSI-RS design in NR"; Agenda Item: 6.1.2.3.2; Source: Huawei, HiSilicon; Document for: Discussion and Decision; Location and Date: Prague, Czech Republic, Aug. 21-25, 2017, Consisting of 6-pages.
3GPP TSG RAN WG1 #90 R1-1714970, Title: "Summary of QCL"; Agenda Item: 6.1.2.3.7; Source: Nokia, Nokia Shanghai Bell; Document for: Discussion; Location and Date: Prague, Czech Republic, Aug. 21-25, 2017, Consisting of 12-pages.

* cited by examiner

TRS slot ( (St = 4, Sf = 4, TRS symbol index = (4, 8))

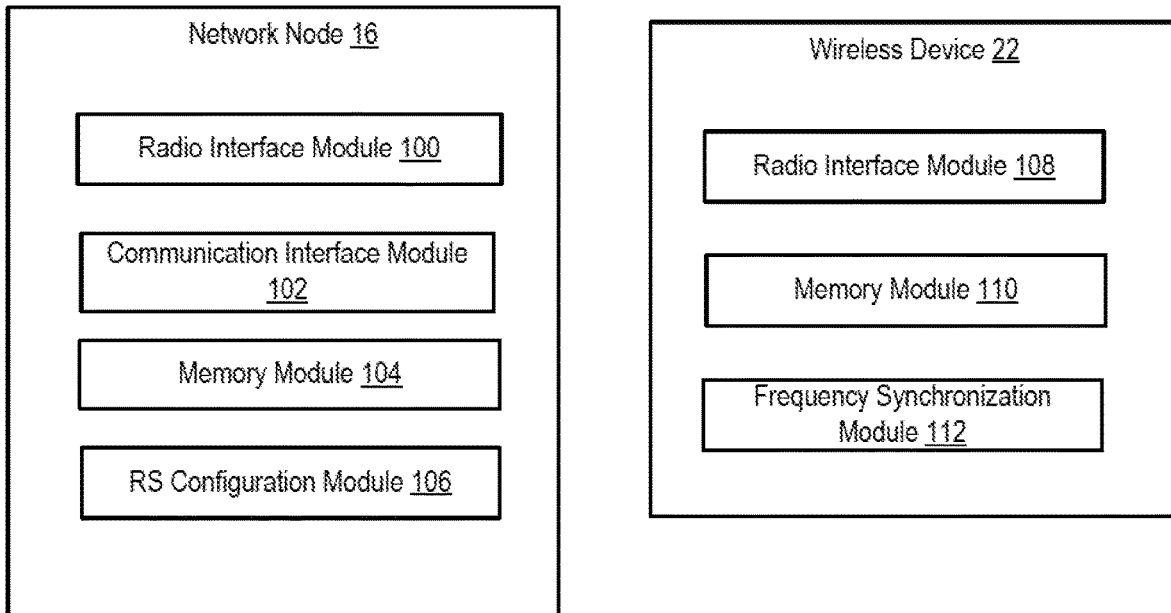
FIG. 7
FIG. 8
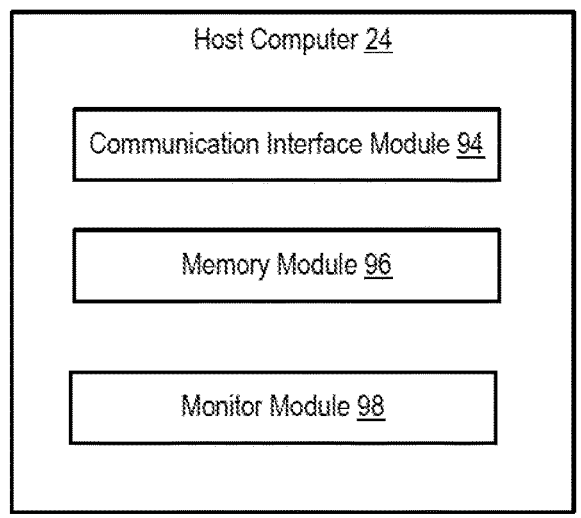
FIG. 6

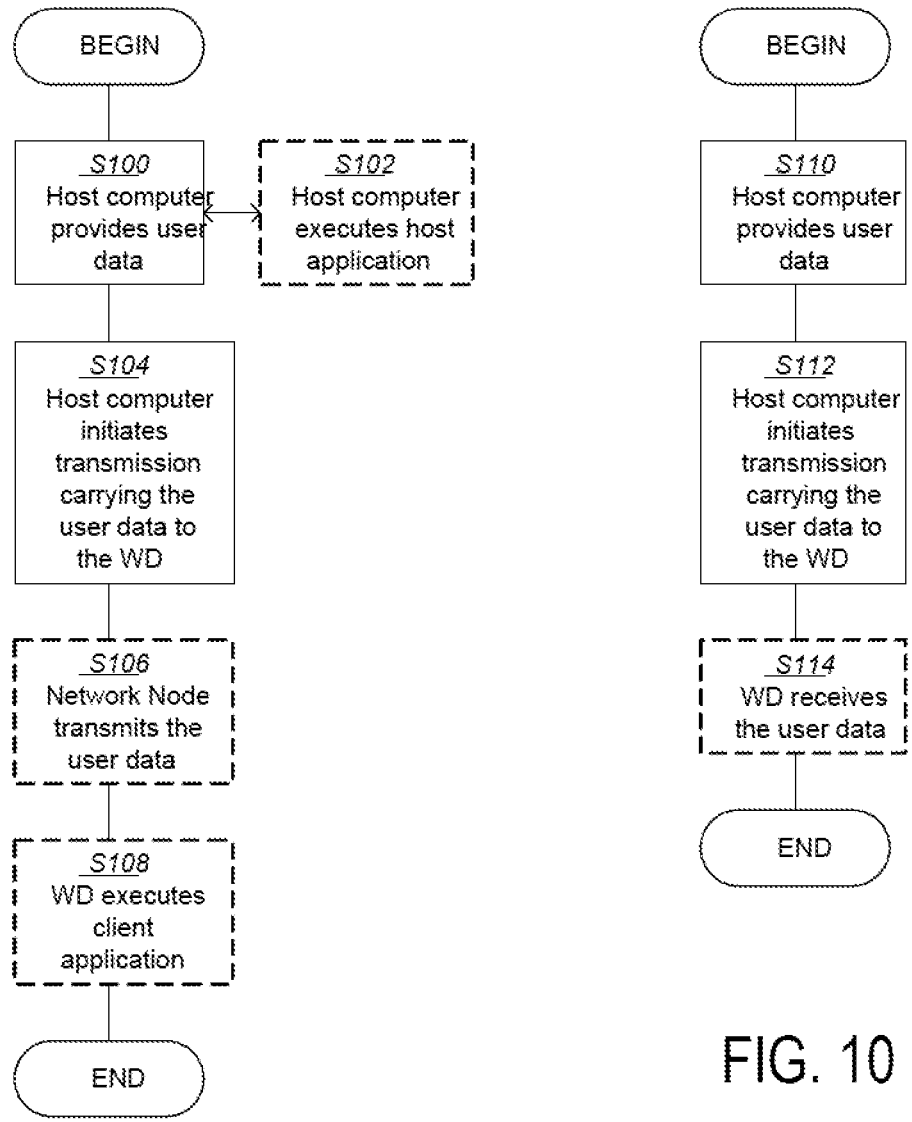

METHODS AND APPARATUSES FOR DOWNLINK TRACKING REFERENCE SIGNAL CONFIGURATION

CROSS-REFERENCE TO RELATED APPLICATION

This application is a Continuation of U.S. Ser. No. 16/193,158, filed Nov. 16, 2018, entitled METHODS AND APPARATUSES FOR DOWNLINK TRACKING REFERENCE SIGNAL CONFIGURATION, which claims priority to U.S. Provisional Patent Application Ser. No. 62/588,048, filed Nov. 17, 2017, entitled METHODS AND APPARATUSES FOR DOWNLINK TRACKING REFERENCE SIGNAL CONFIGURATION, the entireties of both of which of which are incorporated herein by reference.

FIELD

The present disclosure relates to wireless communications, and in particular, to methods and apparatuses for downlink tracking reference signal configurations.

BACKGROUND

In New Radio (NR), a down-link tracking reference signal (TRS) has been introduced to be used to:
 Fine time and frequency synchronization for demodulation;
 Obtain a frequency estimate used for tuning of uplink (UL) frequency to within ~0.1 ppm of the received carrier frequency; and
 Perform Doppler spread and delay spread estimation.
 Frame-synch and rough time and frequency estimation is assumed to be obtained by other means (e.g., synchronization signal block, also referred to as the "SS block").
 Other potential uses for the TRS signal may include
 Downlink (DL) power measurements;
 Link failure detection;
 User equipment (UE) automatic gain control (AGC) training; and
 Beam management.

The TRS slot structure may be based on a comb in frequency domain, repeated in time and may be characterized by the following parameters:
 Sf: TRS subcarrier spacing;
 A comb offset value (measured in subcarriers 0.subcarrier spacing−1);
 St: TRS symbol spacing within a slot;
 N: Number of orthogonal frequency-division multiplexing (OFDM) symbols per TRS within a slot;
 The set of OFDM symbol indices used for the signal; and
 B: TRS bandwidth in terms of number of resource blocks (RBs).
 A TRS burst is a bundle of multiple TRS slots and may be characterized by the following parameters:
 X: the length of TRS burst in terms of number of TRS slots;
 Y: the TRS burst periodicity in terms of number of slots; and
 Slot offset(s) with respect to a common reference, e.g. radio frame boundary.

Figure 1:
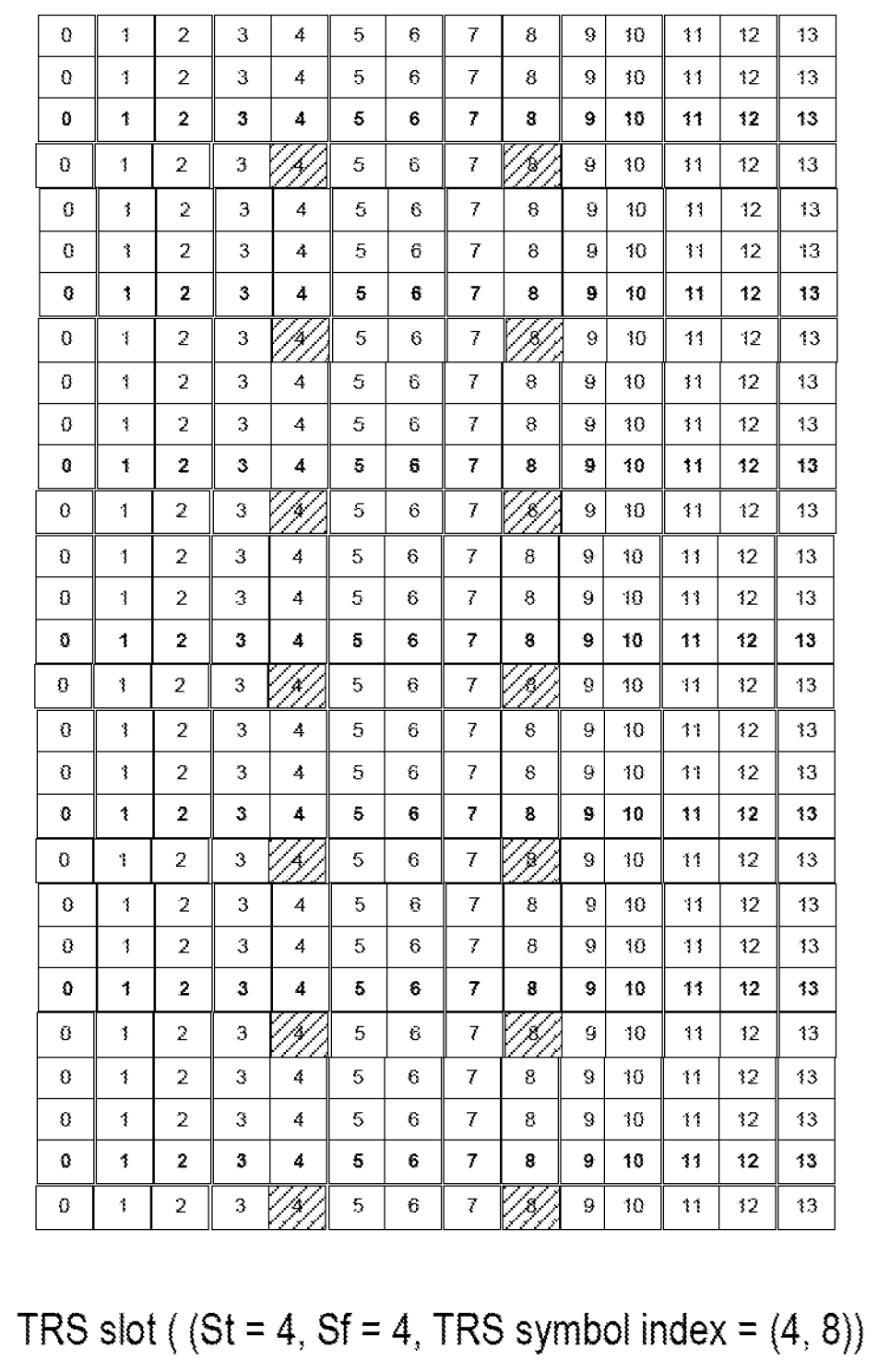

FIG. 1 illustrates an example of a TRS slot. FIG. 2 illustrates an example TRS burst. Of note, FIG. 2 illustrates a TRS burst with two rows due to the limitations of the page size and associated clarity of the numbers, but the two rows are intended as one continuous row representing the exemplary TRS burst.

The channel state information-reference signal (CSI-RS) is a downlink reference signal used to measure channel state information. In $3^{rd}$ Generation Partnership Project (3GPP), it has been considered that the CSI-RS framework can be used for TRS. However, some aspects as to how the CSI-RS framework can be used for TRS have not be determined.

SUMMARY

Some embodiments of this disclosure advantageously provide methods and apparatuses for configuring a downlink tracking reference signal (TRS).

In some embodiments, a network node is provided that is configured to communicate with a wireless device (WD), the network node having a radio interface and processing circuitry, the processing circuitry configured to cause the radio interface to send at least one parameter indicating a configuration of a reference signal resource set (e.g., CSI-RS resource set), the configuration of the reference signal resource set determining whether frequency synchronization can be performed by the wireless device using the reference signal resource set.

In some embodiments, a wireless device configured to communicate with a network node is provided, the WD comprising a radio interface and processing circuitry, the processing circuitry configured to cause the radio interface to receive at least one parameter indicating a configuration of a reference signal resource set; use the at least one parameter to determine the configuration of the reference signal resource set; and based on the determined configuration, determine whether frequency synchronization can be performed using the reference signal resource set.

According to one aspect, a network node configured to communicate with a wireless device, WD, is provided. The network node includes a radio interface; and processing circuitry, the processing circuitry configured to cause the radio interface to transmit a configuration of a reference signal resource set, at least one parameter of the transmitted configuration determining whether frequency synchronization can be performed by the WD using reference signal resources of the reference signal resource set.

In an alternative embodiment of this aspect, the processing circuitry is configured to cause the radio interface to transmit a configuration of a reference signal resource set to the WD, at least one parameter of the transmitted configuration determining whether the WD can assume a same antenna port for all reference signal resources of the reference signal resource set.

According to this aspect, in some embodiments, the reference signal resource set is a set of single-symbol and one-port reference signal resources in at least one slot. In some embodiments of this aspect, the processing circuitry is further configured to cause the radio interface to transmit, to the WD, reference signal resources of the reference signal resource set according to the transmitted configuration of the reference signal resource set. In some embodiments of this aspect, the at least one parameter indicates whether the WD can assume a same antenna port for all reference signal resources of the reference signal resource set. In some embodiments of this aspect, the processing circuitry is further configured to cause the radio interface to transmit the configuration of the reference signal resource set in a radio resource control, RRC, message. In some embodiments of this aspect, the at least one parameter indicates whether reference signal resources of the reference signal resource set are to be transmitted using the same radio frequency, RF, radio chains. In some embodiments of this aspect, the at least one parameter indicates whether reference signal resources of the reference signal resource set are to be transmitted using the same pre-coder. In some embodiments of this aspect, the at least one parameter indicates whether reference signal resources of the reference signal resource set are to be transmitted using the same antenna panel. In some embodiments of this aspect, the at least one parameter indicates whether the WD is to report channel state information, CSI, based on measurements performed on the reference signal resource set to the network node. In some embodiments of this aspect, the processing circuitry is further configured to cause the radio interface to receive a channel state information, CSI, report from the WD, if the at least one parameter indicates that frequency synchronization cannot be performed by the WD using the reference signal resources of the reference signal resource set.

According to another aspect, a method for a network node configured to communicate with a wireless device, WD, is provided. The method includes transmitting a configuration of a reference signal resource set, at least one parameter of the transmitted configuration determining whether frequency synchronization can be performed by the WD using reference signal resources of the reference signal resource set.

In an alternative embodiment of this aspect, the method includes transmitting a configuration of a reference signal resource set to the WD, at least one parameter of the transmitted configuration determining whether the WD can assume a same antenna port for all reference signal resources of the reference signal resource set.

According to this aspect, in some embodiments, the reference signal resource set is a set of single-symbol and one-port reference signal resources in at least one slot. In some embodiments of this aspect, the method further includes transmitting, to the WD, reference signal resources of the reference signal resource set according to the transmitted configuration of the reference signal resource set. In some embodiments of this aspect, the at least one parameter indicates whether the WD can assume a same antenna port for all reference signal resources of the reference signal resource set. In some embodiments of this aspect, the method includes transmitting the configuration of the reference signal resource set in a radio resource control, RRC, message. In some embodiments of this aspect, the at least one parameter indicates whether reference signal resources of the reference signal resource set are to be transmitted using the same radio frequency, RF, radio chains. In some embodiments of this aspect, the at least one parameter indicates whether reference signal resources of the reference signal resource set are to be transmitted using the same pre-coder. In some embodiments of this aspect, the at least one parameter indicates whether reference signal resources of the reference signal resource set are to be transmitted using the same antenna panel. In some embodiments of this aspect, the at least one parameter indicates whether the WD is to report channel state information, CSI, based on measurements performed on the reference signal resource set to the network node. In some embodiments of this aspect, the method further includes receiving a channel state information, CSI, report from the WD, if the at least one parameter indicates that frequency synchronization cannot be performed by the WD using the reference signal resources of the reference signal resource set.

According to yet another aspect, a wireless device, WD, configured to communicate with a network node is provided. The WD includes a radio interface; and processing circuitry. The processing circuitry is configured to cause the radio interface to receive a configuration of a reference signal resource set from the network node; and based on at least one parameter of the received configuration, determine whether frequency synchronization can be performed using reference signal resources of the reference signal resource set.

In an alternative embodiment of this aspect, the processing circuitry is configured to cause the radio interface to receive a configuration of a reference signal resource set from the network node, and based on at least one parameter of the received configuration, determine whether the WD can assume a same antenna port for all reference signal resources of the reference signal resource set.

In some embodiments of this aspect, the reference signal resource set is a set of single-symbol and one-port reference signal resources in at least one slot. In some embodiments of this aspect, the processing circuitry is further configured to perform the frequency synchronization using the reference signal resources, as a result of a determination that the frequency synchronization can be performed using the reference signal resources of the reference signal resource set. In some embodiments of this aspect, the processing circuitry is configured to perform the frequency synchronization based on phase differences between reference signal resources of the reference signal resource set. In some embodiments of this aspect, the processing circuitry is configured to determine whether frequency synchronization can be performed by being configured to determine that the reference signal resource set can be used as a tracking reference signal burst based on the at least one parameter. In some embodiments of this aspect, the processing circuitry is further configured to cause the radio interface to receive the reference signal resources in accordance with the configuration of the reference signal resource set; and perform the frequency synchronization using the received reference signal resources. In some embodiments of this aspect, the at least one parameter indicates whether the WD can assume a same antenna port for all reference signal resources of the reference signal resource set. In some embodiments of this aspect, the at least one parameter indicates whether reference signal resources of the reference signal resource set are to be transmitted by the network node using the same radio frequency, RF, radio chains. In some embodiments of this aspect, the at least one parameter indicates whether reference signal resources of the reference signal resource set are to be transmitted by the network node using the same pre-coder. In some embodiments of this aspect, the at least one parameter indicates whether reference signal resources of the reference signal resource set are to be transmitted by the network node using the same antenna panel. In some embodiments of this aspect, the configuration of the reference signal resource set is received in a radio resource control, RRC, message. In some embodiments of this aspect, the processing circuitry is further configured to determine whether to report channel state information, CSI, from measurements performed on the reference signal resource set to the network node based on the at least one parameter.

According to another aspect of this disclosure, a method for a wireless device, WD, configured to communicate with a network node is provided. The method includes receiving a configuration of a reference signal resource set from the network node; and based on at least one parameter of the received configuration, determining whether frequency synchronization can be performed using reference signal resources of the reference signal resource set.

In an alternative embodiment of this aspect, the method includes receiving a configuration of a reference signal resource set from the network node, and based on at least one parameter of the received configuration, determining whether the WD can assume a same antenna port for all reference signal resources of the reference signal resource set.

According to this aspect, in some embodiments, the reference signal resource set is a set of single-symbol and one-port reference signal resources in at least one slot. In some embodiments of this aspect, the method further includes performing the frequency synchronization using the reference signal resources, as a result of a determination that the frequency synchronization can be performed using the reference signal resources of the reference signal resource set. In some embodiments of this aspect, the frequency synchronization is performed based on a phase differences between reference signal resources of the reference signal resource set. In some embodiments of this aspect, the determining whether frequency synchronization can be performed comprises determining that the reference signal resource set can be used as a tracking reference signal burst based on the at least one parameter. In some embodiments of this aspect, the method further includes receiving the reference signal resources in accordance with the configuration of the reference signal resource set; and performing the frequency synchronization using the received reference signal resources. In some embodiments of this aspect, the at least one parameter indicates whether the WD can assume a same antenna port for all reference signal resources of the reference signal resource set. In some embodiments of this aspect, the at least one parameter indicates whether reference signal resources of the reference signal resource set are to be transmitted by the network node using the same radio frequency, RF, radio chains. In some embodiments of this aspect, the at least one parameter indicates whether reference signal resources of the reference signal resource set are to be transmitted by the network node using the same pre-coder. In some embodiments of this aspect, the at least one parameter indicates whether reference signal resources of the reference signal resource set are to be transmitted by the network node using the same antenna panel. In some embodiments of this aspect, the configuration of the reference signal resource set is received in a radio resource control, RRC, message. In some embodiments of this aspect, the method further includes determining whether to report channel state information, CSI, from measurements performed on the reference signal resource set to the network node based on the at least one parameter.

According to another aspect, a computer program is provided that, when executed by at least one processor of a network node, causes the network node to perform any of the methods of the network node.

According to another aspect, a computer program is provided that, when executed by at least one processor of a wireless device, causes the wireless device to perform any of the methods of the wireless device.

According to yet another aspect, a computer storage device is provided that includes the computer programs to be executed by at least one processor of the network node or the wireless device.

According to yet another aspect, a user equipment (UE) configured to communicate with a network node of a new radio wireless communication system is provided. The UE includes a radio interface; and processing circuitry, the processing circuitry configured to cause the radio interface to receive a configuration of a reference signal resource set from the network node, the reference signal resource set being a set of single-symbol and single antenna port reference signal resources in at least one slot; and based on at least one parameter of the received configuration, determine whether the UE can assume a same antenna port for all reference signal resources of the reference signal resource set.

In some embodiments of this aspect, the processing circuitry is further configured to perform a frequency synchronization using the reference signal resources, as a result of a determination that the UE can assume a same antenna port for all reference signal resources of the reference signal resource set. In some embodiments of this aspect, the processing circuitry is configured to perform the frequency synchronization based on phase differences between reference signal resources of the reference signal resource set. In some embodiments of this aspect, the processing circuitry is configured to determine whether the UE can assume a same antenna port for all reference signal resources by being configured to determine that the reference signal resource set can be used as a tracking reference signal burst based on the at least one parameter. In some embodiments of this aspect, the processing circuitry is further configured to cause the radio interface to receive the reference signal resources in accordance with the configuration of the reference signal resource set; and perform a frequency synchronization using the received reference signal resources. In some embodiments of this aspect, the configuration of the reference signal resource set is received in a radio resource control, RRC, message. In some embodiments of this aspect, the processing circuitry is further configured to determine whether to report channel state information, CSI, from measurements performed on the reference signal resource set to the network node based on the at least one parameter.

According to another aspect, a method for a user equipment (UE) is provided. The UE is configured to communicate with a network node of a new radio wireless communication system. The method includes receiving a configuration of a reference signal resource set from the network node, the reference signal resource set being a set of single-symbol and single antenna port reference signal resources in at least one slot; and based on at least one parameter of the received configuration, determining whether the UE can assume a same antenna port for all reference signal resources of the reference signal resource set.

In some embodiments of this aspect, the method further includes performing the frequency synchronization using the reference signal resources, as a result of a determination that the UE can assume a same antenna port for all reference signal resources of the reference signal resource set. In some embodiments of this aspect, the frequency synchronization is performed based on a phase differences between reference signal resources of the reference signal resource set. In some embodiments of this aspect, the determining whether the UE can assume a same antenna port for all reference signal resources comprises determining that the reference signal resource set can be used as a tracking reference signal burst based on the at least one parameter. In some embodiments of this aspect, the method further includes receiving the reference signal resources in accordance with the configuration of the reference signal resource set; and performing a frequency synchronization using the received reference signal resources. In some embodiments of this aspect, the configuration of the reference signal resource set is received in a radio resource control, RRC, message. In some embodiments of this aspect, the method further includes determining whether to report channel state information, CSI, from measurements performed on the reference signal resource set to the network node based on the at least one parameter.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 1 illustrates an example TRS slot;
FIG. 2 illustrates an example TRS burst;
FIG. 6 is a block diagram of an alternative embodiment of a host computer according to some embodiments of the present disclosure;
FIG. 7 is a block diagram of an alternative embodiment of a network node according to some embodiments of the present disclosure;
FIG. 8 is a block diagram of an alternative embodiment of a wireless device according to some embodiments of the present disclosure;
FIG. 9 is a flowchart illustrating an exemplary method implemented in a communication system including a host computer, a network node and a wireless device according to some embodiments of the present disclosure;
FIG. 10 is a flowchart illustrating an exemplary method implemented in a communication system including a host computer, a network node and a wireless device according to some embodiments of the present disclosure.

DETAILED DESCRIPTION

The channel state information-reference signal (CSI-RS) is a downlink reference signal used to measure channel state information. There may exist a one port CSI-RS configuration with similar structure as a one symbol TRS slot. In the 3rd Generation Partnership Project (3GPP), it has been considered that the CSI-RS framework can be used for TRS.

To accomplish this, there can be a configuration of multiple single-symbol CSI-RS resources to a WD, which can be grouped.

The receiver (e.g., WD) can process all CSI-RS resources in a group jointly to estimate time/frequency. Such a group of CSI-RS resources makes up a CSI-RS resource set.

Figure 3:
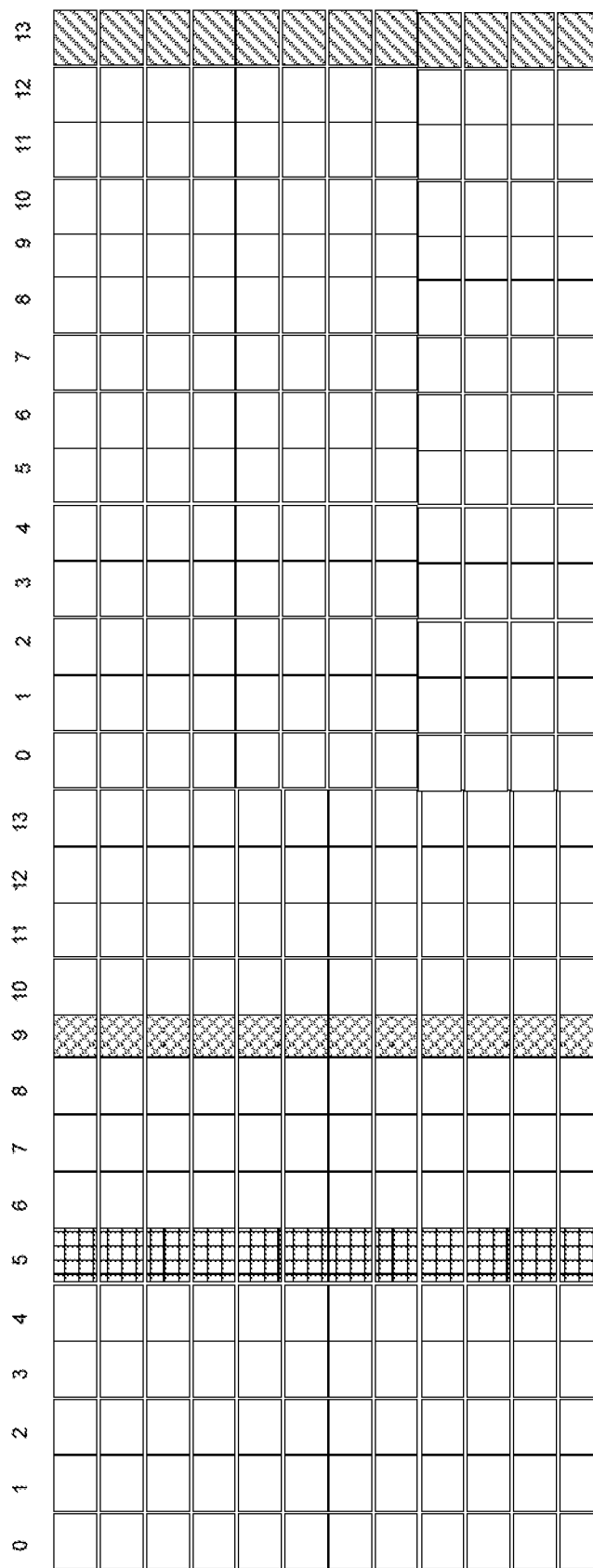
FIG. 3 illustrates an example configuration for how to use a CSI-RS to create a TRS slot.

For example, FIG. 3 illustrates an example configuration for how to use the CSI-RS to create a TRS slot, which is described as follows:

Configure three one symbol, one port CSI-RS resources (index 1,2,3);
Resource idx 1: mapped to symbol 5, has periodicity 20 slots, slot offset 0;
Resource idx 2: mapped to symbol 9, has periodicity 20 slots, slot offset 0;
Resource idx 3: mapped to symbol 13, has periodicity 20 slots, slot offset 1;
Configure a grouping/association between CSI-RS resources 1-3; and
Use resource jointly in the processing (as would be the case with TRS).

It is noted that FIG. 3 is merely an example and that other TRS configurations may be used. It is also noted that there may exist other CSI-RS resource configurations, such as, for example, multi-symbol CSI-RS resources that potentially also could be combined in a similar way as described above. However, for TRS, the one port TRS resource occupying only one symbol is likely sufficient for most scenarios, because the single symbol resources can be placed more flexibly. In contrast, multi-symbol CSI-RS resources are comprised of pairs of symbols, where the symbol locations within a pair are almost always adjacent.

It has been considered in 3GPP that the TRS burst can be configured as a set of one port, single-symbol, CSI-RS resources. Multiple periodic reference signal (RS) resources may be configured, which may be mapped to different slots (and sometimes different slot offsets). A burst is defined as a collection of one periodic instance from each of the multiple resources.

Frequency estimation is based on comparing the relative phase of the signal measured in at least two-time instances. Unfortunately, if the signal phase varies due to incoherency in the signal generation, problems may arise. For example, incoherency may result due to different radio chains being used for the two or more time instances, or due to change of the precoder used, etc. Coherency may not be guaranteed across CSI-RS resources given the specified framework.

Accordingly, frequency estimation can in general not be performed accurately across CSI-RS resources using some existing techniques.

Thus, some embodiments provide for a network node configured to send at least one parameter indicating a configuration of a reference signal resource set to a wireless device. In embodiments, the configuration of the reference signal resource set determines whether frequency synchronization can be performed by the wireless device using the reference signal resource set. Stated another way, in some embodiments, the network node may send the at least one parameter to indicate the configuration of the reference signal resource set based on whether the network node sends the reference signal resource set coherently, as described herein.

Advantageously, the wireless device may use the at least one parameter to determine whether or not to use the reference signal resource set to perform fine time and/or frequency synchronization. In some additional embodiments, the wireless device may also use the at least one parameter to determine whether or not to report CSI back to the network node based on the measurements performed on the reference signal resource set. Embodiments of the present invention may therefore more efficiently utilize resources and/or improve communication over the network.

Before describing in detail exemplary embodiments, it is noted that the embodiments reside primarily in combinations of apparatus components and processing steps related to configuration of a downlink tracking reference signal. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or a wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, 3GPP LTE, may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 4:
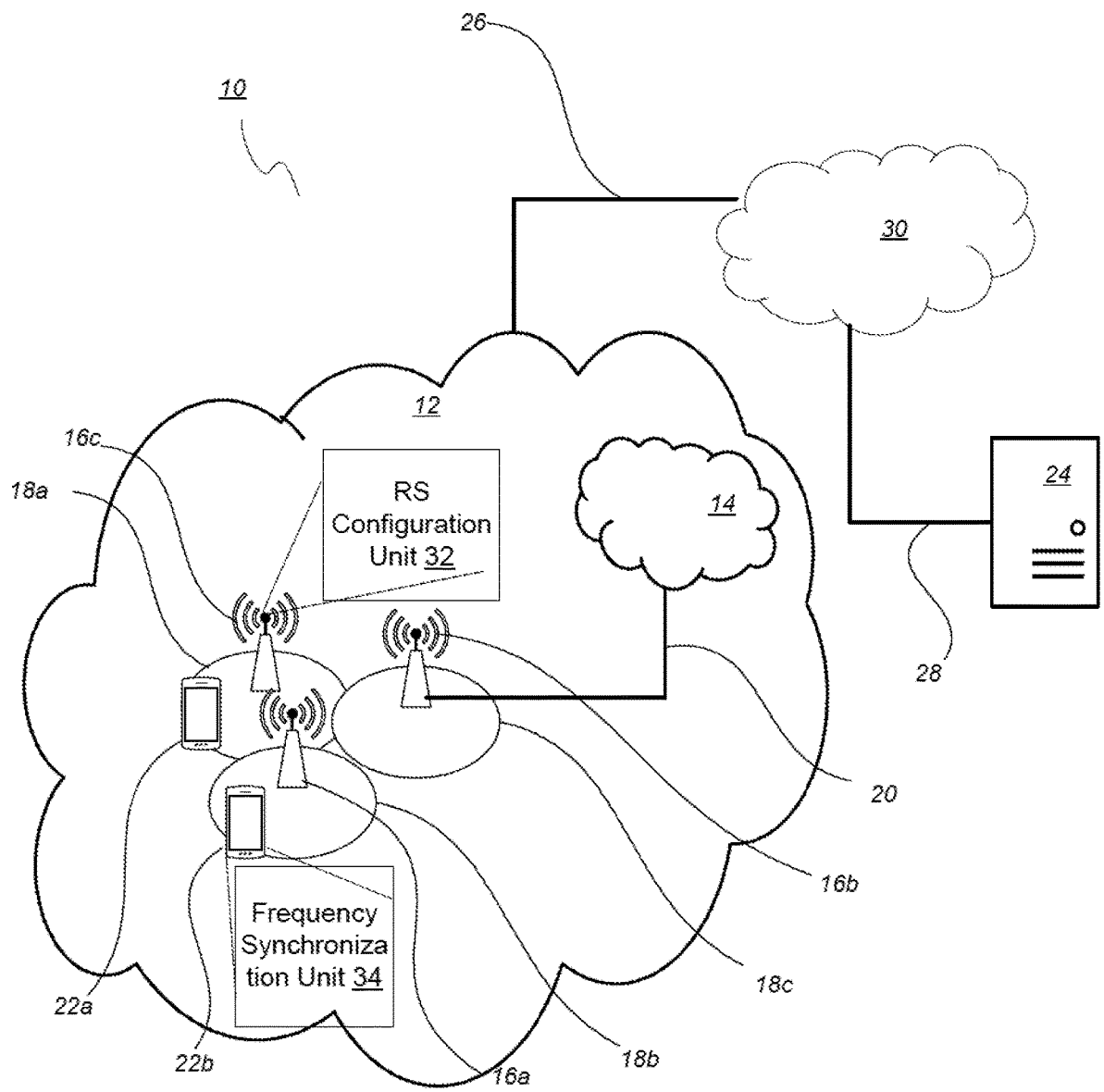
FIG. 4 is a schematic diagram of an exemplary network architecture illustrating a communication system connected via an intermediate network to a host computer according to the principles in the present disclosure.

Returning to the drawing figures, in which like elements are referred to by like reference numerals, there is shown in FIG. 4 a schematic diagram of a communication system, according to an embodiment, including a communication system 10, such as a 3GPP-type cellular network, which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 4 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 may be configured to include a reference signal configuration unit 32 which is configured to send at least one parameter indicating a configuration of a reference signal resource set, the configuration of the reference signal resource set determining whether frequency synchronization can be performed by the wireless device using the reference signal resource set. A wireless device 22 may be configured to include a frequency synchronization unit 34 which is configured to receive at least one parameter indicating a configuration of a reference signal resource set; use the at least one parameter to determine the configuration of the reference signal resource set; and based on the determined configuration, determine whether frequency synchronization can be performed using the reference signal resource set.

Example implementations, in accordance with an embodiment, of the WD 22, network node 16 and host computer 24 discussed in the preceding paragraphs will now be described with reference to FIG. 5. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to a traditional processor and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may include a monitor unit 54 configured to enable the service provider to monitor the network node 16 and/or the wireless device 22.

The communication system 10 further includes a network node 16 provided in a communication system 10 and comprising hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to a traditional processor and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include reference signal (RS) configuration unit 32 configured to cause the radio interface 62 to transmit a configuration of a reference signal resource set, at least one parameter of the transmitted configuration determining whether frequency synchronization can be performed by the WD 22 using reference signal resources of the reference signal resource set.

In an alternative embodiment, the processing circuitry 68 of the network node 16 is configured to cause the radio interface 62 to transmit a configuration of a reference signal resource set to the WD 22, at least one parameter of the transmitted configuration determining whether the WD 22 can assume a same antenna port for all reference signal resources of the reference signal resource set.

In some embodiments of the network node 16, the processing circuitry 68 (e.g., the RS configuration unit 32) is further configured to cause the radio interface 62 to transmit a configuration of a reference signal resource set, at least one parameter of the transmitted configuration determining whether frequency synchronization can be performed by the WD 22 using reference signal resources of the reference signal resource set. In some embodiments, the reference signal resource set is a set of single-symbol and one-port reference signal resources in at least one slot. In some embodiments, the processing circuitry 68 (e.g., the RS configuration unit 32) is further configured to cause the radio interface 62 to transmit, to the WD 22, reference signal resources of the reference signal resource set according to the transmitted configuration of the reference signal resource set. In some embodiments, the at least one parameter indicates whether the WD 22 can assume a same antenna port for all reference signal resources of the reference signal resource set. In some embodiments, the processing circuitry 68 (e.g., the RS configuration unit 32) is further configured to cause the radio interface 62 to transmit the configuration of the reference signal resource set in a radio resource control, RRC, message. In some embodiments, the at least one parameter indicates whether reference signal resources of the reference signal resource set are to be transmitted using the same radio frequency, RF, radio chains. In some embodiments, the at least one parameter indicates whether reference signal resources of the reference signal resource set are to be transmitted using the same pre-coder. In some embodiments, the at least one parameter indicates whether reference signal resources of the reference signal resource set are to be transmitted using the same antenna panel. In some embodiments, the at least one parameter indicates whether the WD 22 is to report channel state information, CSI, based on measurements performed on the reference signal resource set to the network node 16. In some embodiments, the processing circuitry 68 is further configured to cause the radio interface 62 to receive a channel state information, CSI, report from the WD 22, if the at least one parameter indicates that frequency synchronization cannot be performed by the WD 22 using the reference signal resources of the reference signal resource set.

In some embodiments, the RS configuration unit 32 may be configured to send at least one parameter indicating a configuration of a reference signal resource set, the configuration of the reference signal resource set determining whether frequency synchronization can be performed by the wireless device using the reference signal resource set. In some embodiments, the processing circuitry 68 may optionally be further configured to cause the radio interface 62 to send the reference signal resource set one of coherently and non-coherently based on the configuration of the reference signal resource set and/or may send the at least one parameter based on whether the reference signal resource set is to be sent the one of coherently and non-coherently.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to a traditional processor and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a frequency synchronization unit 34 configured to cause the radio interface 82 to receive a configuration of a reference signal resource set from the network node 16; and based on at least one parameter of the received configuration, determine whether frequency synchronization can be performed using reference signal resources of the reference signal resource set.

In an alternative embodiment, the processing circuitry 84 of the WD 22 is configured to cause the radio interface 82 to receive a configuration of a reference signal resource set from the network node 16, and based on at least one parameter of the received configuration, determine whether the WD 22 can assume a same antenna port for all reference signal resources of the reference signal resource set.

In some embodiments of the WD 22, the reference signal resource set is a set of single-symbol and one-port reference signal resources in at least one slot. In some embodiments, the processing circuitry 84 (e.g., the frequency synchronization unit 34) is further configured to perform the frequency synchronization using the reference signal resources, as a result of a determination that the frequency synchronization can be performed using the reference signal resources of the reference signal resource set. In some embodiments, the processing circuitry 84 (e.g., the frequency synchronization unit 34) is configured to perform the frequency synchronization based on phase differences between reference signal resources of the reference signal resource set. In some embodiments, the processing circuitry 84 (e.g., the frequency synchronization unit 34) is configured to determine whether frequency synchronization can be performed by being configured to determine that the reference signal resource set can be used as a tracking reference signal burst based on the at least one parameter. In some embodiments, the processing circuitry 84 (e.g., the frequency synchronization unit 34) is further configured to cause the radio interface 82 to receive the reference signal resources in accordance with the configuration of the reference signal resource set; and perform the frequency synchronization using the received reference signal resources. In some embodiments, the at least one parameter indicates whether the WD 22 can assume a same antenna port for all reference signal resources of the reference signal resource set. In some embodiments, the at least one parameter indicates whether reference signal resources of the reference signal resource set are to be transmitted by the network node 16 using the same radio frequency, RF, radio chains. In some embodiments, the at least one parameter indicates whether reference signal resources of the reference signal resource set are to be transmitted by the network node 16 using the same precoder. In some embodiments, the at least one parameter indicates whether reference signal resources of the reference signal resource set are to be transmitted by the network node 16 using the same antenna panel. In some embodiments, the configuration of the reference signal resource set is received, such as via the radio interface 82, in a radio resource control, RRC, message. In some embodiments, the processing circuitry 84 (e.g., the frequency synchronization unit 34) is further configured to determine whether to report channel state information, CSI, from measurements performed on the reference signal resource set to the network node 16 based on the at least one parameter.

In some embodiments, the processing circuitry 84 may be configured to receive at least one parameter indicating a configuration of a reference signal resource set; use the at least one parameter to determine the configuration of the reference signal resource set; and based on the determined configuration, determine whether frequency synchronization can be performed using the reference signal resource set. In some embodiments, the processing circuitry 84 (e.g., the frequency synchronization unit 34) may further be configured to perform or not perform frequency synchronization on the reference signal resource set based on the at least one parameter and/or the configuration of the reference signal resource set. In some embodiments, the processing circuitry 84 may also be configured to report or not report CSI to the network node 16, based on the at least one parameter and/or the configuration of the reference signal resource set.

Figure 5:
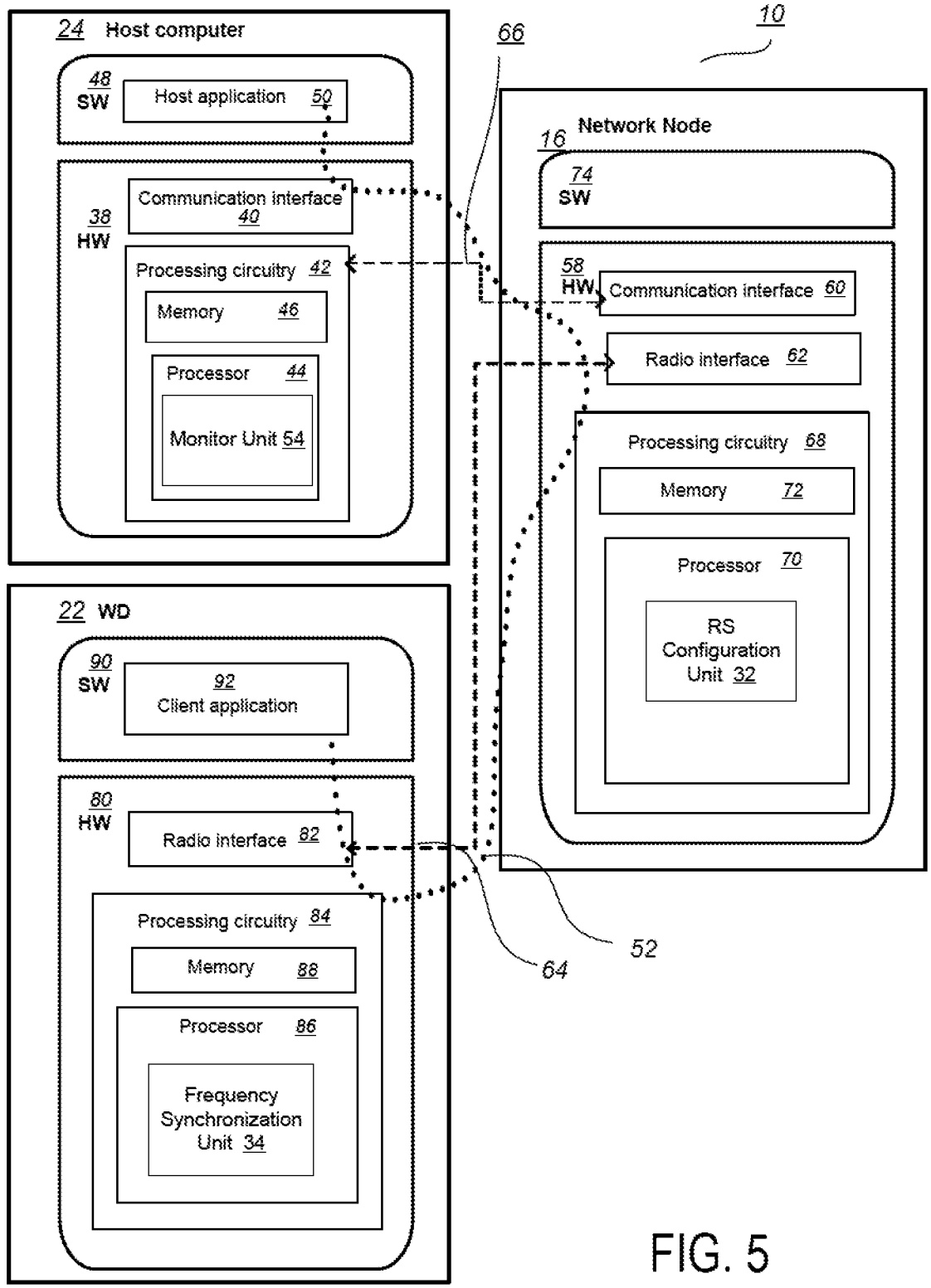
FIG. 5 is a block diagram of a host computer communicating via a network node with a wireless device over an at least partially wireless connection according to some embodiments of the present disclosure.

Although FIGS. 4 and 5 show various "units" such as frequency synchronization unit 34, monitor unit 54, and RS configuration unit 32 as being within a respective processor, it is contemplated that these units may be implemented such that a portion of the unit is stored in a corresponding memory within the processing circuitry. In other words, the units may be implemented in hardware or in a combination of hardware and software within the processing circuitry.

In some embodiments, the inner workings of the network node 16, WD 22, and host computer 24 may be as shown in FIG. 5 and independently, the surrounding network topology may be that of FIG. 4.

In FIG. 5, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

FIG. 6 is a block diagram of an alternative host computer 24, which may be implemented at least in part by software modules containing software executable by a processor to perform the functions described herein. The host computer 24 include a communication interface module 94 configured to set up and maintain a wired or wireless connection with an interface of a different communication device of the communication system 10. The memory module 96 is configured to store data, programmatic software code and/or other information described herein. Monitor module 98 is configured to enable the service provider to monitor the network node 16 and or the wireless device 22.

FIG. 7 is a block diagram of an alternative network node 16, which may be implemented at least in part by software modules containing software executable by a processor to perform the functions described herein. The network node 16 includes a radio interface module 100 configured for setting up and maintaining at least a wireless connection 64 with a WD 22 located in a coverage area 18 served by the network node 16. The network node 16 also includes a communication interface module 102 configured for setting up and maintaining a wired or wireless connection with an interface of a different communication device of the communication system 10. The communication interface module 102 may also be configured to facilitate a connection 66 to the host computer 24. The memory module 104 that is configured to store data, programmatic software code and/or other information described herein. The reference signal (RS) configuration module 106 is configured to send the at least one parameter to indicate to a wireless device (WD) 22 a configuration of a reference signal resource set, the configuration of the reference signal resource set determining whether frequency synchronization can be performed by the WD 22 using the reference signal resource set. In some embodiments, the RS configuration module 106 may be further configured to cause the radio interface 62 to send the reference signal resource set one of coherently and non-coherently and may send the at least one parameter based on whether the reference signal resource set is to be sent the one of coherently and non-coherently.

FIG. 8 is a block diagram of an alternative wireless device 22, which may be implemented at least in part by software modules containing software executable by a processor to perform the functions described herein. The WD 22 includes a radio interface module 108 configured to set up and maintain a wireless connection 64 with a network node 16 serving a coverage area 18 in which the WD 22 is currently located. The memory module 110 is configured to store data, programmatic software code and/or other information described herein. The frequency synchronization module 112 is configured to cause the radio interface 82 to receive at least one parameter indicating a configuration of a reference signal resource set; use the at least one parameter to determine the configuration of the reference signal resource set; and based on the determined configuration, determine whether frequency synchronization can be performed using the reference signal resource set. In some embodiments, the frequency synchronization module 112 may further be configured to perform or not perform frequency synchronization on the reference signal resource set based on the at least one parameter and/or the configuration of the reference signal resource set. In some embodiments, the frequency synchronization module 112 may also be configured to report or not report CSI to the network node 16, based on the at least one parameter and/or the configuration of the reference signal resource set.

FIG. 9 is a flowchart illustrating an exemplary method implemented in a communication system, such as, for example, the communication system of FIGS. 4 and 5, in accordance with one embodiment. The communication system may include a host computer 24, a network node 16 and a WD 22, which may be those described with reference to FIG. 5. In a first step of the method, the host computer 24 provides user data (block S100). In an optional substep of the first step, the host computer 24 provides the user data by executing a host application, such as, for example, the host application 74 (block S102). In a second step, the host computer 24 initiates a transmission carrying the user data to the WD 22 (block S104). In an optional third step, the network node 16 transmits to the WD 22 the user data which was carried in the transmission that the host computer 24 initiated, in accordance with the teachings of the embodiments described throughout this disclosure (block S106). In an optional fourth step, the WD 22 executes a client application, such as, for example, the client application 114, associated with the host application 74 executed by the host computer 24 (block S108).

FIG. 10 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 4 and 5. In a first step of the method, the host computer 24 provides user data (block S110). In an optional substep (not shown) the host computer 24 provides the user data by executing a host application, such as, for example, the host application 74. In a second step, the host computer 24 initiates a transmission carrying the user data to the WD 22 (block S112). The transmission may pass via the network node 16, in accordance with the teachings of the embodiments described throughout this disclosure. In an optional third step, the WD 22 receives the user data carried in the transmission (block S114).

Figures 11, 12:
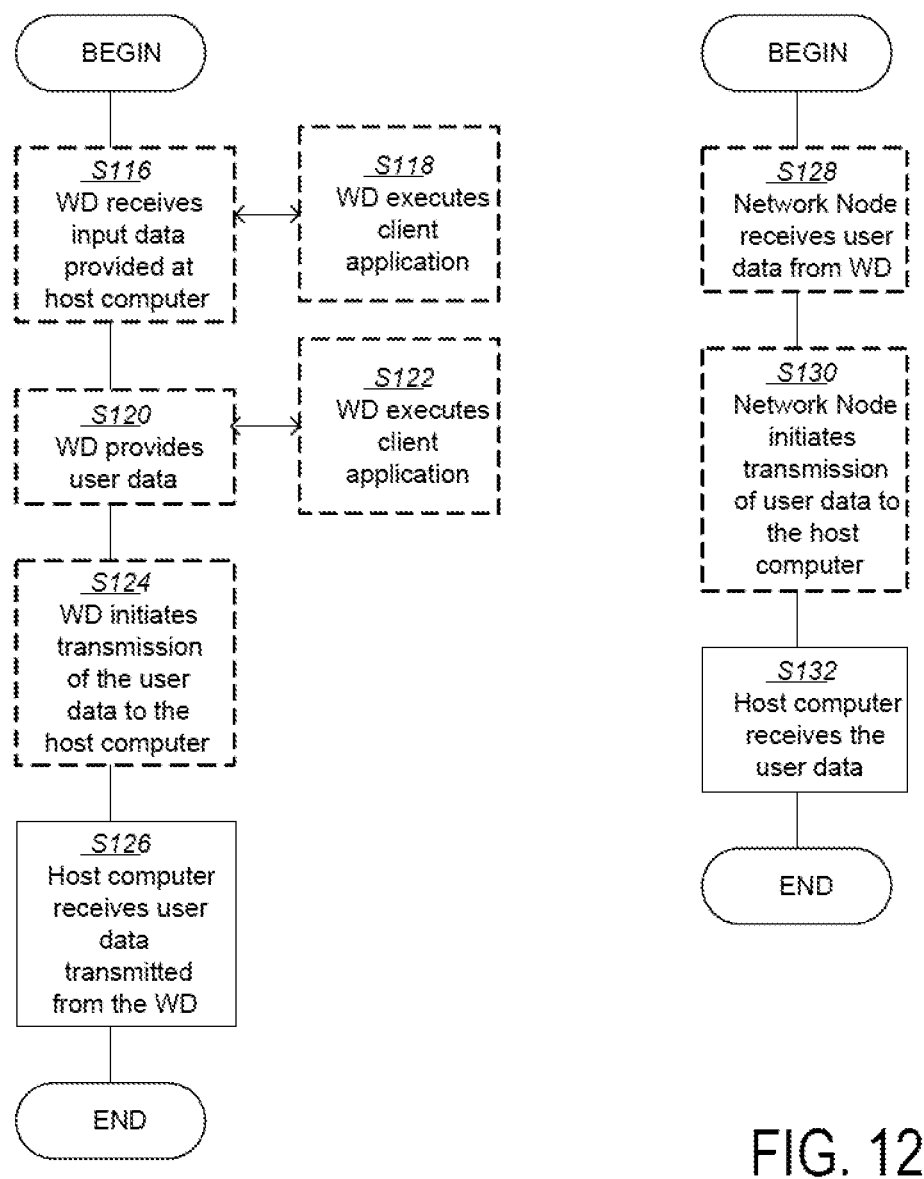
FIG. 11 is a flowchart illustrating an exemplary method implemented in a communication system including a host computer, a network node and a wireless device according to some embodiments of the present disclosure.
FIG. 12 is a flowchart illustrating an exemplary method implemented in a communication system including a host computer, a network node and a wireless device according to some embodiments of the present disclosure.

FIG. 11 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 4 and 5. In an optional first step of the method, the WD 22 receives input data provided by the host computer 24 (block S116). In an optional substep of the first step, the WD 22 executes the client application 114, which provides the user data in reaction to the received input data provided by the host computer 24 (block S118). Additionally, or alternatively, in an optional second step, the WD 22 provides user data (block S120). In an optional substep of the second step, the WD provides the user data by executing a client application, such as, for example, client application 114 (block S122). In providing the user data, the executed client application 114 may further consider user input received from the user. Regardless of the specific manner in which the user data was provided, the WD 22 may initiate, in an optional third substep, transmission of the user data to the host computer 24 (block S124). In a fourth step of the method, the host computer 24 receives the user data transmitted from the WD 22, in accordance with the teachings of the embodiments described throughout this disclosure (block S126).

FIG. 12 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 4 and 5. In an optional first step of the method, in accordance with the teachings of the embodiments described throughout this disclosure, the network node 16 receives user data from the WD 22 (block S128). In an optional second step, the network node 16 initiates transmission of the received user data to the host computer 24 (block S130).

In a third step, the host computer 24 receives the user data carried in the transmission initiated by the network node 16 (block S132).

Figure 13:
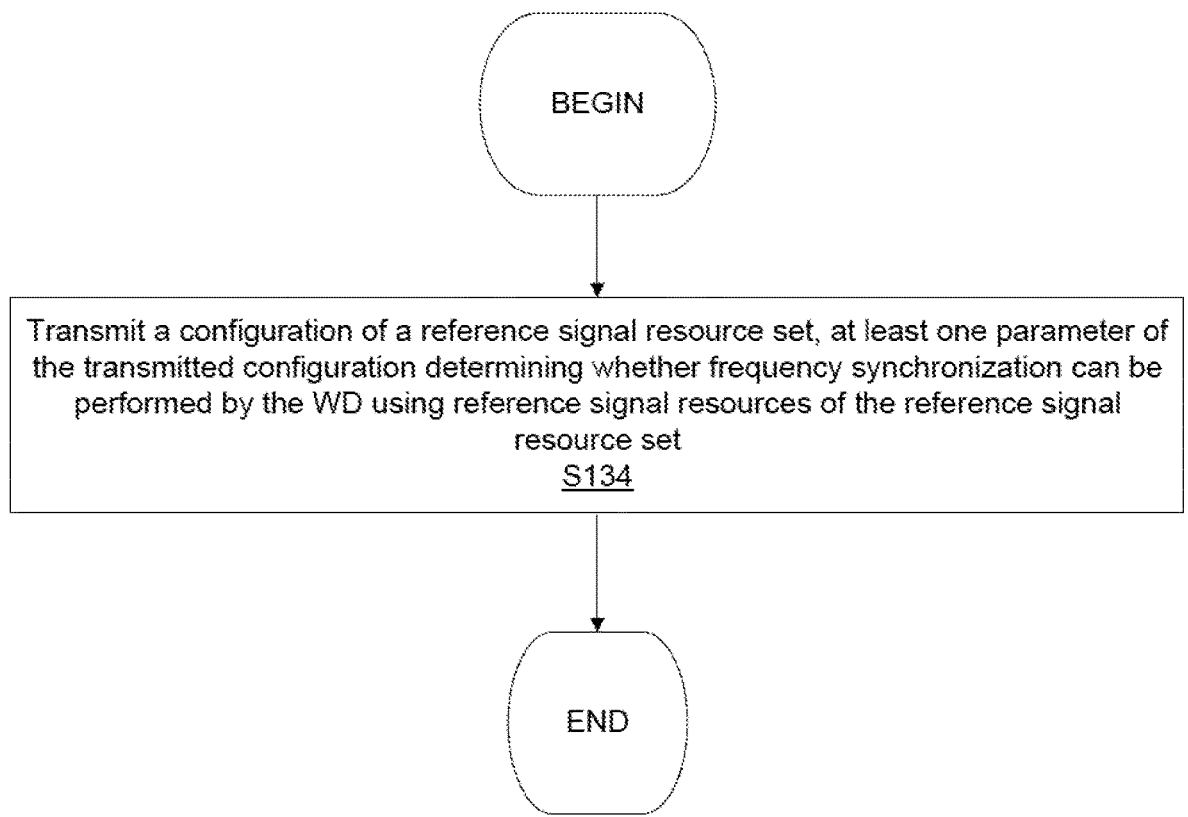
FIG. 13 is a flowchart of an exemplary process in a network node for configuring a reference signal resource set according to some embodiments of the present disclosure.

FIG. 13 is a flowchart of an exemplary process implemented in a network node 16, such as via the RS configuration unit 32. The process includes transmitting, such as via the radio interface 62, a configuration of a reference signal resource set, at least one parameter of the transmitted configuration determining whether frequency synchronization can be performed by the WD 22 using reference signal resources of the reference signal resource set (block S134).

Figure 14:
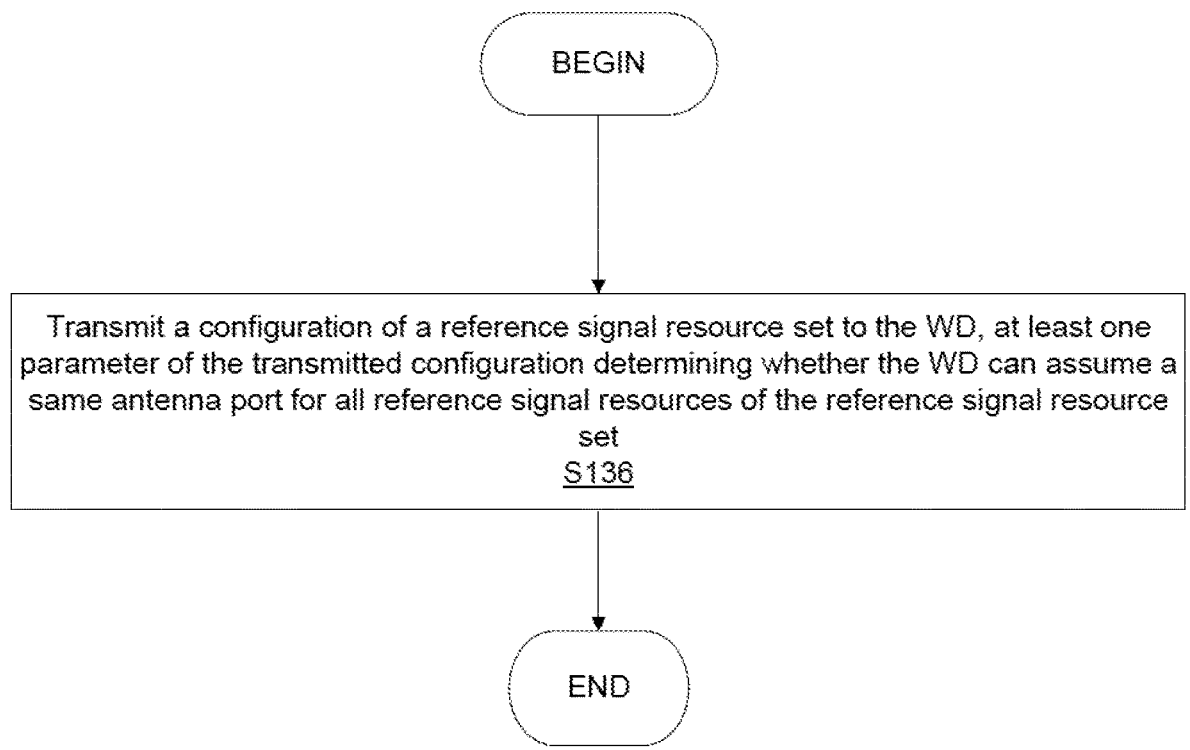
FIG. 14 is a flowchart of an alternative exemplary process in a network node for configuring a reference signal resource set according to some embodiments of the present disclosure

FIG. 14 is a flowchart of an alternative embodiment of the process implemented in the network node 16. The process includes transmitting, such as via the radio interface 62, a configuration of a reference signal resource set to the WD 22, at least one parameter of the transmitted configuration determining whether the WD 22 can assume a same antenna port for all reference signal resources of the reference signal resource set (block S136).

In some embodiments of the exemplary processes for the network node 16, the reference signal resource set is a set of single-symbol and one-port reference signal resources in at least one slot. In some embodiments, the method further includes transmitting, such as via the radio interface 62, to the WD 22, reference signal resources of the reference signal resource set according to the transmitted configuration of the reference signal resource set. In some embodiments, the at least one parameter indicates whether the WD 22 can assume a same antenna port for all reference signal resources of the reference signal resource set. In some embodiments, the method further includes transmitting, such as via the radio interface 62, the configuration of the reference signal resource set in a radio resource control, RRC, message. In some embodiments, the at least one parameter indicates whether reference signal resources of the reference signal resource set are to be transmitted using the same radio frequency, RF, radio chains. In some embodiments, the at least one parameter indicates whether reference signal resources of the reference signal resource set are to be transmitted using the same pre-coder. In some embodiments, the at least one parameter indicates whether reference signal resources of the reference signal resource set are to be transmitted using the same antenna panel. In some embodiments, the at least one parameter indicates whether the WD 22 is to report channel state information, CSI, based on measurements performed on the reference signal resource set to the network node 16. In some embodiments, the method further includes receiving a channel state information, CSI, report from the WD 22, if the at least one parameter indicates that frequency synchronization cannot be performed by the WD 22 using the reference signal resources of the reference signal resource set.

In some embodiments, the process may include sending at least one parameter indicating a configuration of a reference signal resource set, the configuration of the reference signal resource set determining whether frequency synchronization can be performed by the wireless device using the reference signal resource set. In some embodiments, the process may optionally further include transmitting, such as via the radio interface 62, to the WD 22, the reference signal resource set one of coherently and non-coherently based on the configuration of the reference signal resource set.

Figure 15:
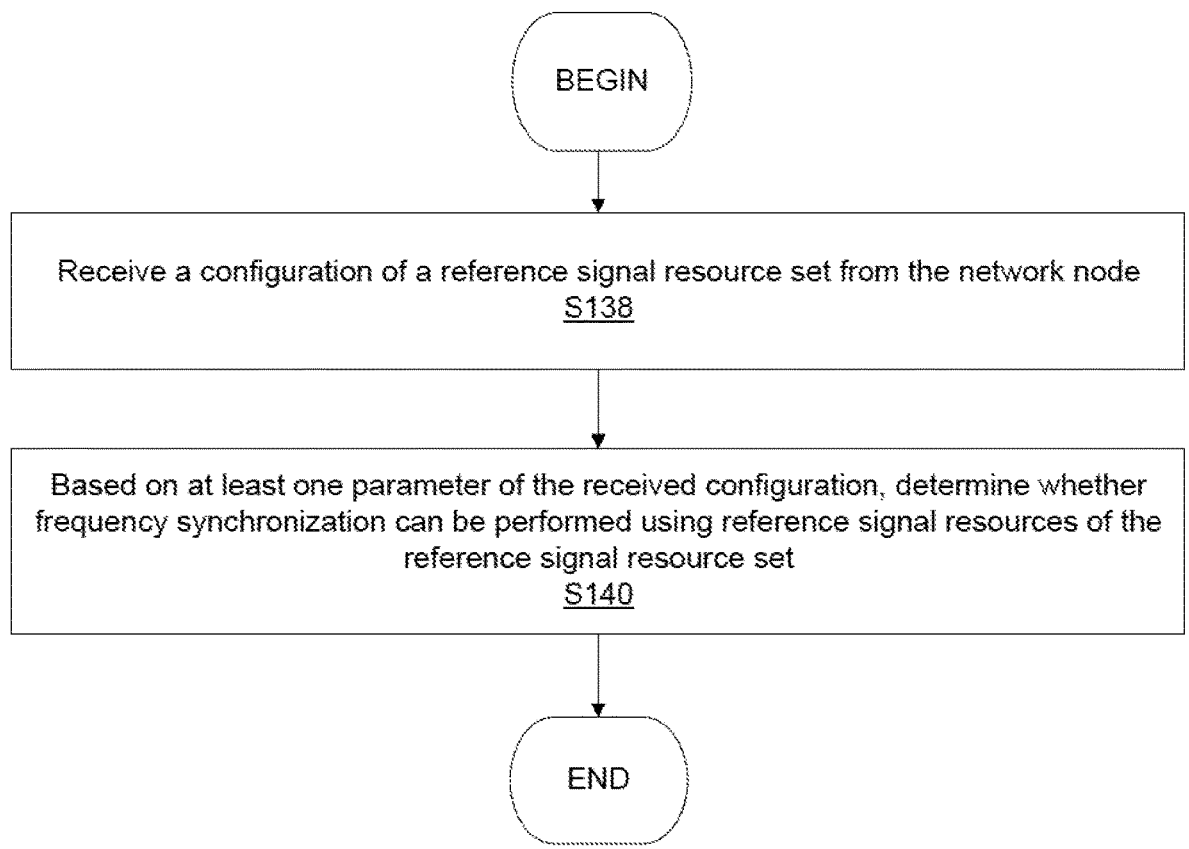
FIG. 15 is a flowchart of an exemplary process in a wireless device for determining whether to perform frequency synchronization using a reference signal resource set, based on a received configuration parameter, according to some embodiments of the present disclosure.

FIG. 15 is a flowchart of an exemplary process implemented by a wireless device 22. The process includes receiving, such as via the radio interface 82, a configuration of a reference signal resource set from the network node 16 (block S138). The process includes, based on at least one parameter of the received configuration, determining, such as via the frequency synchronization unit 34, whether frequency synchronization can be performed using reference signal resources of the reference signal resource set (block S140).

Figure 16:
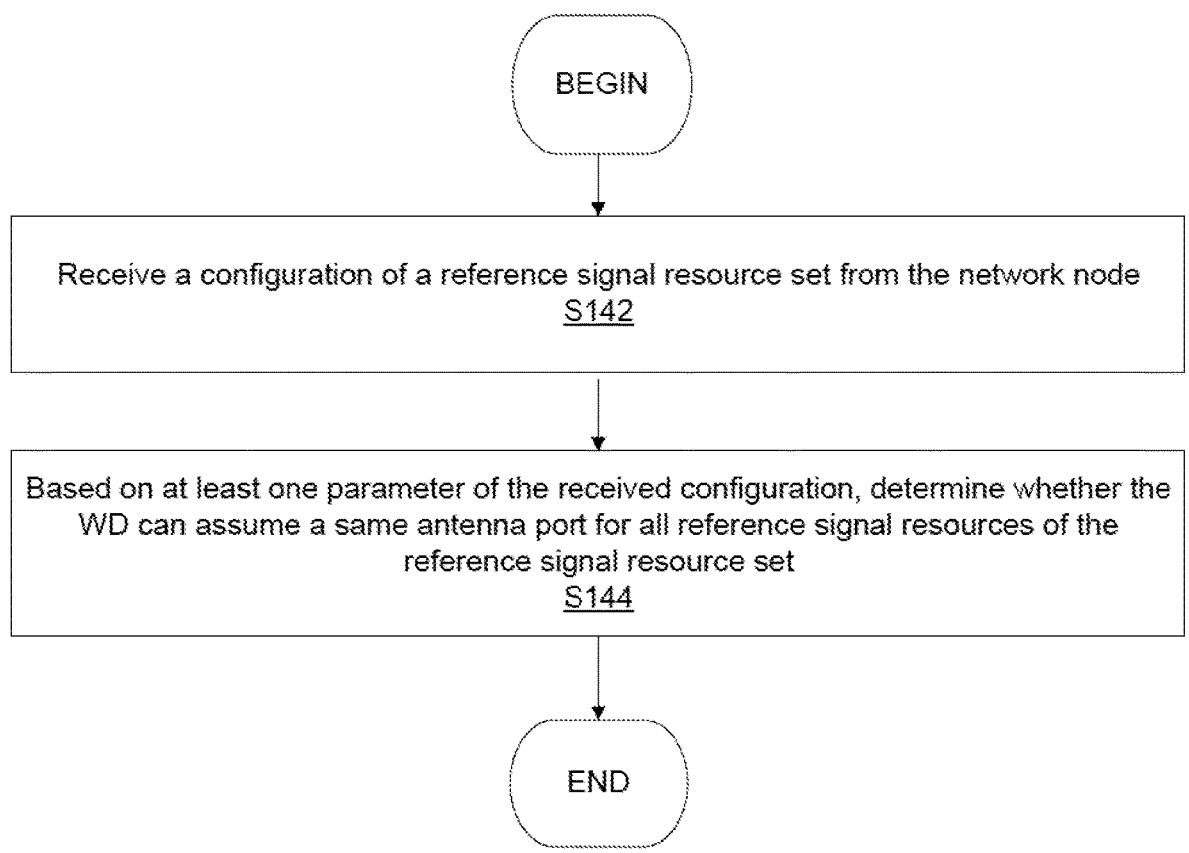
FIG. 16 is a flowchart of an alternative exemplary process in a wireless device, according to some embodiments of the present disclosure.

FIG. 16 is a flowchart of an alternative embodiment of the process implemented in the wireless device 22 where the wireless device is configured to communicate with a network node 16. The process includes receiving a configuration of a reference signal resource set from the network node 16 (block S142). The alternative process includes, based on at least one parameter of the received configuration, determining whether the WD 22 can assume a same antenna port for all reference signal resources of the reference signal resource set (block S144).

In some embodiments of the exemplary processes of the wireless device 22, the reference signal resource set is a set of single-symbol and one-port reference signal resources in at least one slot. In some embodiments, the method further includes performing, such as via the frequency synchronization unit 34, the frequency synchronization using the reference signal resources, as a result of a determination that the frequency synchronization can be performed using the reference signal resources of the reference signal resource set. In some embodiments, the frequency synchronization is performed, such as via the frequency synchronization unit 34, based on a phase differences between reference signal resources of the reference signal resource set. In some embodiments, the determining whether frequency synchronization can be performed comprises determining that the reference signal resource set can be used as a tracking reference signal burst based on the at least one parameter. In some embodiments, the method further includes receiving, such as via the radio interface 82, the reference signal resources in accordance with the configuration of the reference signal resource set; and performing, such as via the frequency synchronization unit 34, the frequency synchronization using the received reference signal resources. In some embodiments, the at least one parameter indicates whether the WD 22 can assume a same antenna port for all reference signal resources of the reference signal resource set. In some embodiments, the at least one parameter indicates whether reference signal resources of the reference signal resource set are to be transmitted by the network node 16 using the same radio frequency, RF, radio chains. In some embodiments, the at least one parameter indicates whether reference signal resources of the reference signal resource set are to be transmitted by the network node 16 using the same pre-coder. In some embodiments, the at least one parameter indicates whether reference signal resources of the reference signal resource set are to be transmitted by the network node 16 using the same antenna panel. In some embodiments, the configuration of the reference signal resource set is received in a radio resource control, RRC, message. In some embodiments, the method further includes determining, such as via the frequency synchronization unit 34, whether to report channel state information, CSI, from measurements performed on the reference signal resource set to the network node 16 based on the at least one parameter.

In some embodiments, the process may include receiving at least one parameter indicating a configuration of a reference signal resource set, and using, such as via the frequency synchronization unit 34, the at least one parameter to determine the configuration of the reference signal resource set, and based on the determined configuration, determining, such as via the frequency synchronization unit 34, whether frequency synchronization can be performed using the reference signal resource set.

In some embodiments, the process may further include performing or not performing frequency synchronization, such as via the frequency synchronization unit 34, on the reference signal resource set based on the at least one parameter and/or the configuration of the reference signal resource set. In some embodiments, the process may also include reporting or not reporting CSI to the network node 16, based on the at least one parameter and/or the configuration of the reference signal resource set.

Figure 17:
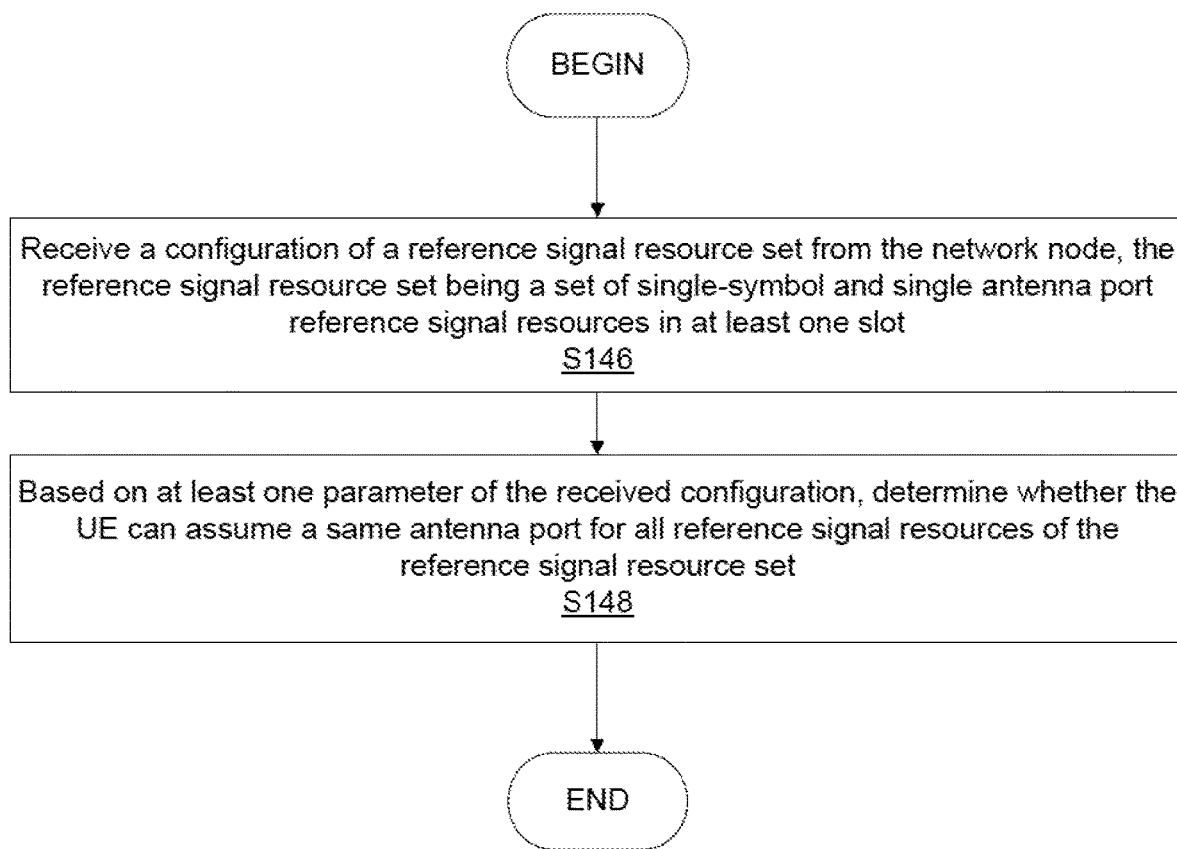
FIG. 17 is a flowchart of yet another exemplary process in a wireless device for receiving and/or processing reference signals according to some embodiments of the present disclosure.

FIG. 17 is a flowchart of another exemplary process in a wireless device 22. The process includes receiving (block S146), such as via radio interface 82, a configuration of a reference signal resource set from the network node, the reference signal resource set being a set of single-symbol and single antenna port reference signal resources in at least one slot. The process includes, based on at least one parameter of the received configuration, determining (block S148), such as via processing circuitry 84 and/or frequency synchronization unit 34, whether the wireless device 22 can assume a same antenna port for all reference signal resources of the reference signal resource set. In some embodiments, the exemplary process further includes performing the frequency synchronization using the reference signal resources, as a result of a determination that the wireless device 22 can assume a same antenna port for all reference signal resources of the reference signal resource set. In some embodiments, the frequency synchronization is performed based on a phase differences between reference signal resources of the reference signal resource set. In some embodiments, the determining whether the wireless device 22 can assume a same antenna port for all reference signal resources comprises determining that the reference signal resource set can be used as a tracking reference signal burst based on the at least one parameter. In some embodiments, the example process further includes receiving the reference signal resources in accordance with the configuration of the reference signal resource set; and performing a frequency synchronization using the received reference signal resources. In some embodiments, the configuration of the reference signal resource set is received in a radio resource control, RRC, message. In some embodiments, the process further includes determining whether to report channel state information, CSI, from measurements performed on the reference signal resource set to the network node based on the at least one parameter.

Having described some embodiments of this disclosure, a more detailed description of at least some of the embodiments will now be described. Some embodiments of the disclosure provide that, in order to make frequency estimation possible by, for example, the WD 22 (e.g., UE), different RS resources may be configured to enable the CSI-RS frame work to be used.

In some embodiments, the CSI-RS resources constituting a CSI-RS resource set are coherently transmitted by the network node 17, for example, a base station (e.g., gNB). In further embodiments, for coherency, the gNB may transmit all CSI-RS resources of the set using the same pre-coder from the same transmission point. However, in some embodiments, this may not be sufficient to ensure coherency.

Thus, in further embodiments, the absolute phase of the transmitted TRS may not be allowed to change during the transmission of the TRS burst. Accordingly, in such embodiments, the same radio frequency (RF) radio chain may be used to transmit, by the network node 16, each of the CSI-RS resources in the different OFDM symbols, and phase variations in RF may be avoided between the CSI-RS resource transmissions (e.g., possible with constant power to avoid potential power amplifier (PA) phase variations due to transmit power differences).

In yet further embodiments, all CSI-RS resource transmissions making up the TRS burst may come from the same antenna panel, same RF chain, and same component carrier.

In some embodiments, transmitting the TRS in the same beam may not be sufficient. Thus, some embodiments provide for the possibility for the network node 16 to specify that all CSI-RS resources within a resource set are transmitted coherently so that the WD 22 may be informed that the TRS can be used for frequency synchronization.

Furthermore, compared to CSI-RS, CSI reporting back to the network node 16 (e.g., base station) may not be provided by the wireless device 22 (e.g., UE) for TRS in some embodiments.

Thus, in some embodiments, the network node 16 (e.g., gNB) informs the WD 22 (e.g., UE) that the WD 22 can use a set of CSI-RS resources as a tracking reference signal for performing fine time and frequency synchronization. The WD 22 may informed by the network node 16 that the CSI-RS resource set can be used for frequency synchronization (and that the different CSI-RS resources have been coherently transmitted from the network node 16), or, in some embodiments, the WD 22 may be configured to assume that a specific CSI-RS format is always transmitted in a way that guarantees that CSI-RS resources are coherent.

In one embodiment, the radio resource control (RRC) configuration parameters may include a parameter that can be used to inform the WD 22 that it can assume that the different CSI-RS resources are coherently transmitted from the network node 16. If the parameter indicates to the WD 22 that the different CSI-RS resources were coherently transmitted from the network node 16, then the WD 22 may use the CSI-RS set to perform frequency synchronization and fine time synchronization. If not, then the WD 22 may still use the CSI-RS set for fine time synchronization, but not for frequency synchronization.

Furthermore, in some embodiments, if the configuration parameters include a parameter that can be used to inform the WD 22 that WD 22 can assume that the different CSI-RS resources are coherently transmitted from the network node 16, then such parameter can also be used to inform the WD 22 that the received CSI-RS associated with the parameter is not a normal CSI-RS and that the WD 22 does not have to report channel state information (CSI) based on measurements from this CSI-RS set.

Figure 18:
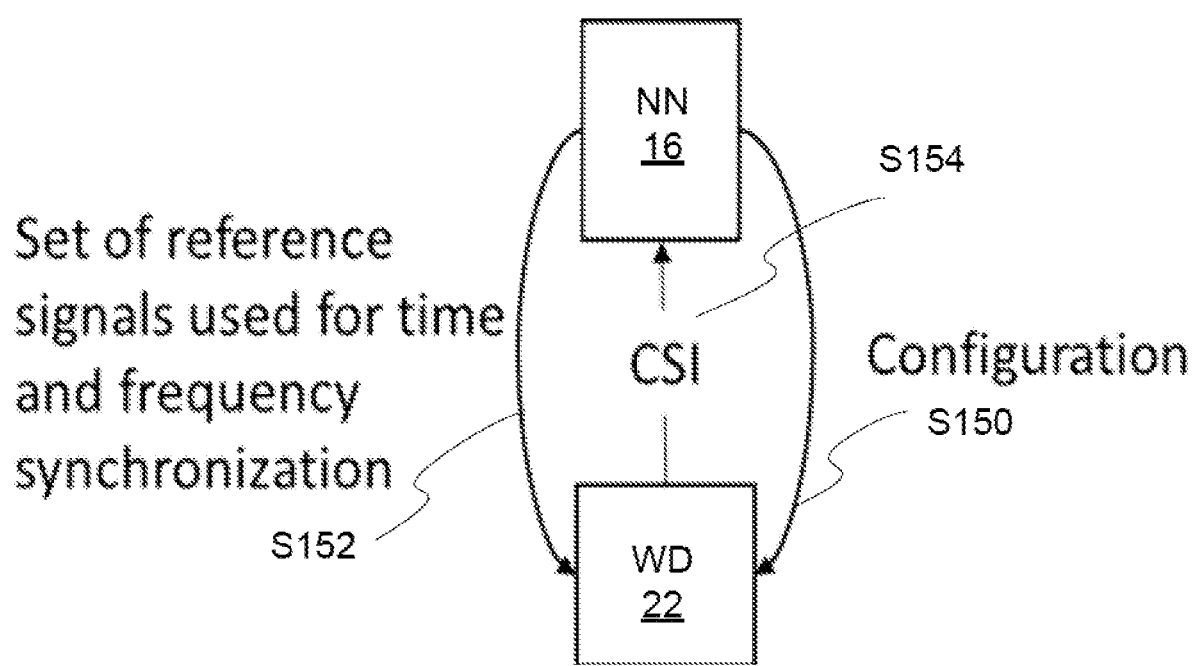
FIG. 18 is a schematic diagram illustrating an exemplary communication flow according to some embodiments of the present disclosure.

Referring now to FIG. 18, in some embodiments, the network node 16 (e.g., gNB) configures the WD 22 (e.g., UE) in step S150. The WD 22 may then know what symbols that can be used for time and frequency synchronization. The WD 22 can then demodulate the physical downlink shared channel (PDSCH) and transmit data. The network node 16 may transmit the set of reference signals, which may be used for time and frequency synchronization to the WD 22 in step S152. In some embodiments, if the configuration indicates that the set of reference signals is normal CSI-RS, the WD 22 may report CSI in step S154.

In some embodiments, the configuration can be either explicit, where an RRC parameter in the CSI-RS configuration indicates if the CSI-RS resources in the resource set are (mutually) coherently transmitted or not. In other embodiments, the CSI-RS configuration may be implicit where, for example, a specific CSI format (which may be determined or detected by the WD 22) may indicate to the WD 22 that the CSI-RS resources in the resource set are always coherently transmitted by the network node 16. Accordingly, in such embodiments if the CSI-RS resources in the resource set are coherently transmitted, the WD 22 can perform frequency synchronization. Furthermore, in the same way, the WD 22 can also determine if CSI should be reported or not. In other words, in some embodiments, when the WD 22 determines or is informed that the CSI-RS sources are coherent and can be used to perform frequency synchronization, the WD 22 may further determine that a CSI report should not be sent to the network node 16.

Figure 19:
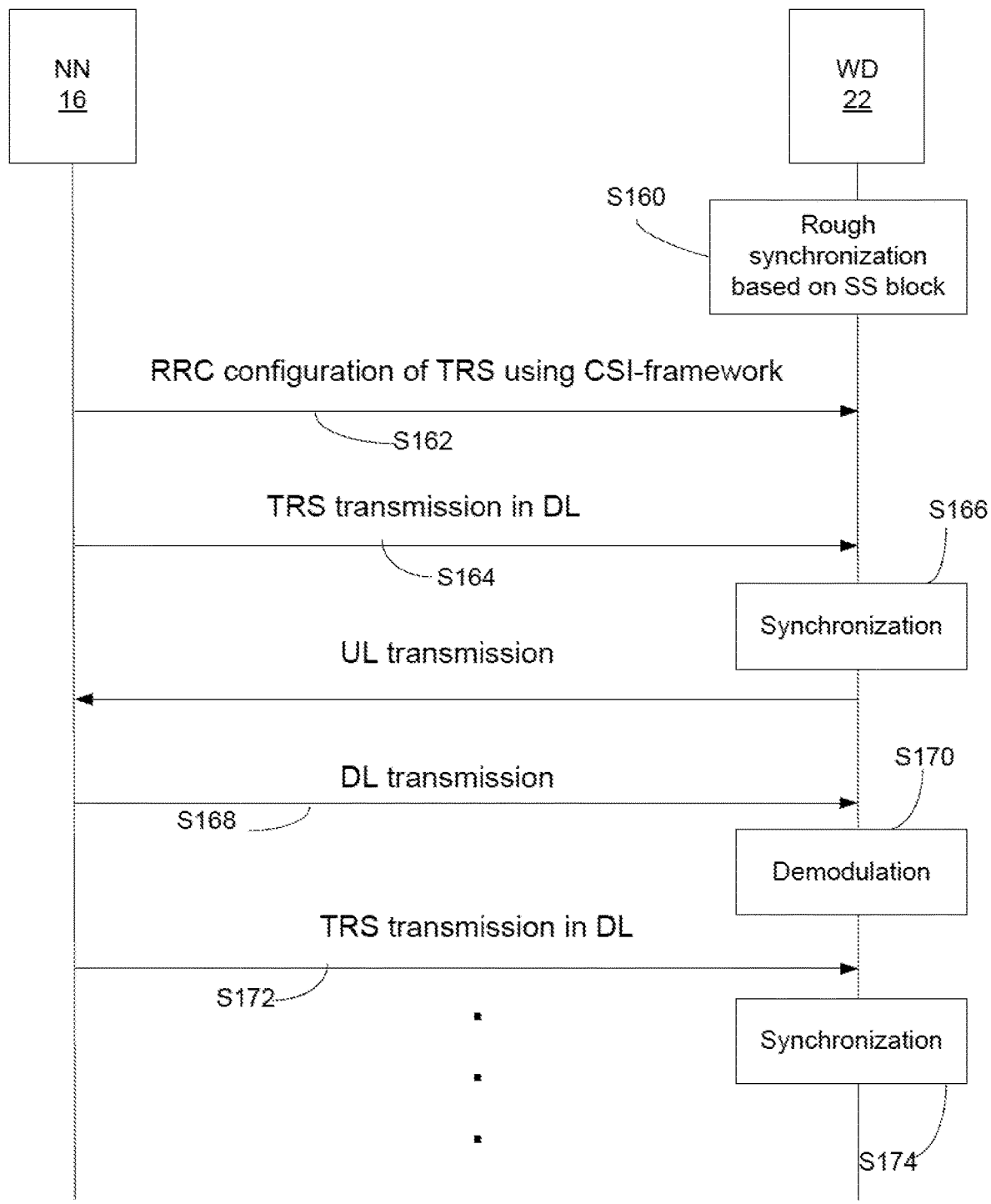
FIG. 19 is a schematic diagram illustrating another exemplary communication flow according to some embodiment of the present disclosure.

Referring now to FIG. 19, during initial access the WD 22 may obtain a rough time and frequency synch from receiving the SS Block (block S160). The network node 16 may then transmit an RRC message that can be used to configure a TRS (using the CSI-RS frame work) (S162). The WD 22 may then know the format of the TRS and what symbols that should be used for time and frequency synchronization. Thus, the WD 22 may know how and when to receive the first TRS burst (S164). By the WD 22 performing time and frequency synchronization (S166), the WD 22 can receive the PDSCH (S168) and the WD 22 can demodulate PDSCH (S170). The WD 22 may also be able to transmit data in an uplink (UL) transmission that is fine-tuned based on measurements performed on the TRS. After some time, determined by the periodicity of the TRS (Y), the WD 22 may receive a new TRS burst (S172) and the WD 22 may re-synchronize to the network node 16 (S174), as described above, and the exemplary process may continue according to principles described in the present disclosure to provide downlink synchronization.

In some embodiments, the TRS is used by the WD 22 to perform frequency synchronization using the TRS resources, to, for example compensate for Doppler shift, oscillator frequency error, oscillator frequency drift. In one example, the WD 22 may perform frequency synchronization by estimating the carrier frequency of the received signal and by using the estimate to tune the frequency of an oscillator in WD 22 to adjust to the carrier frequency of the received signal. By utilizing the tuned oscillator for down-conversion of the received signal, phase errors and inter subcarrier interference resulting from a frequency offset is removed or, in the case of a residual error, reduced. Furthermore, by utilizing the tuned oscillator to generate the carrier for the WD 22 uplink transmission, the frequency offset between the carrier frequency of the WD 22 uplink transmission and the carrier frequency of the BS downlink transmission is removed or, in the case of a residual error, reduced. The term frequency synchronization is used for the combination of frequency estimation and the use of the frequency estimate to improve the reception of the downlink signal and/or to adjust the carrier frequency of the uplink transmission. The improvement of the reception of the downlink signal is achieved through a removal/reduction of inter subcarrier interference and/or phase errors. The removal/reduction of inter subcarrier interference and/or phase errors can be achieved through tuning of a WD 22 oscillator and using this oscillator for down-conversion of the received signal but it can be achieved also in other ways.

In some embodiments, the configuration can be either explicit, where an RRC parameter in the CSI-RS configuration indicates if the CSI-RS resources in the resource set are coherently transmitted or not. In other embodiments, the configuration may be implicit where a specific CSI format indicates that the CSI-RS resources in the resource set are always coherently transmitted. In such embodiments, if the CSI-RS resources in the resource set are coherently transmitted the WD 22 can perform frequency synchronization. Furthermore, in the same way the WD 22 can also determine if CSI should be reported or not back to the network node 16.

Embodiments of the present disclosure advantageously provide for the re-use of CSI-RS framework to setup a tracking reference signal that can be used for fine time and frequency synchronization. In some embodiments, adding a parameter to the CSI-RS configuration parameters that is used to inform the WD 22 that the transmission of different CSI-RS resources in the CSI-RS resource set are transmitted coherently so that the WD 22 can use the tracking reference signal for frequency synchronization. Alternatively, the WD 22 may determine implicitly whether or not the CSI-RS configuration is intended to be a tracking reference signal since the configuration may be unique. Furthermore, in some embodiments, if the WD 22 knows that the CSI-RS is intended to be used as a tracking reference signal, the WD 22 may determine that the WD 22 does not have to report CSI to the network node 16.

According to yet another aspect, a user equipment (UE) 22 configured to communicate with a network node 16 of a new radio wireless communication system is provided. The UE 22 includes a radio interface 82; and processing circuitry 84, the processing circuitry 84 configured to cause the radio interface 82 to receive a configuration of a reference signal resource set from the network node 16, the reference signal resource set being a set of single-symbol and single antenna port reference signal resources in at least one slot; and based on at least one parameter of the received configuration, determine whether the UE 22 can assume a same antenna port for all reference signal resources of the reference signal resource set.

In some embodiments of this aspect, the processing circuitry 84 is further configured to perform a frequency synchronization using the reference signal resources, as a result of a determination that the UE 22 can assume a same antenna port for all reference signal resources of the reference signal resource set. In some embodiments of this aspect, the processing circuitry 84 is configured to perform the frequency synchronization based on phase differences between reference signal resources of the reference signal resource set. In some embodiments of this aspect, the processing circuitry 84 is configured to determine whether the UE 22 can assume a same antenna port for all reference signal resources by being configured to determine that the reference signal resource set can be used as a tracking reference signal burst based on the at least one parameter. In some embodiments of this aspect, the processing circuitry 84 is further configured to cause the radio interface 82 to receive the reference signal resources in accordance with the configuration of the reference signal resource set; and perform a frequency synchronization using the received reference signal resources. In some embodiments of this aspect, the configuration of the reference signal resource set is received in a radio resource control, RRC, message. In some embodiments of this aspect, the processing circuitry 84 is further configured to determine whether to report channel state information, CSI, from measurements performed on the reference signal resource set to the network node 16 based on the at least one parameter.

According to another aspect, a method for a user equipment (UE) 22 is provided. The UE 22 is configured to communicate with a network node 16 of a new radio wireless communication system. The method includes receiving a configuration of a reference signal resource set from the network node 16, the reference signal resource set being a set of single-symbol and single antenna port reference signal resources in at least one slot; and based on at least one parameter of the received configuration, determining whether the UE 22 can assume a same antenna port for all reference signal resources of the reference signal resource set.

In some embodiments of this aspect, the method further includes performing the frequency synchronization using the reference signal resources, as a result of a determination that the UE 22 can assume a same antenna port for all reference signal resources of the reference signal resource set. In some embodiments of this aspect, the frequency synchronization is performed based on a phase differences between reference signal resources of the reference signal resource set. In some embodiments of this aspect, the determining whether the UE 22 can assume a same antenna port for all reference signal resources comprises determining that the reference signal resource set can be used as a tracking reference signal burst based on the at least one parameter. In some embodiments of this aspect, the method further includes receiving the reference signal resources in accordance with the configuration of the reference signal resource set; and performing a frequency synchronization using the received reference signal resources. In some embodiments of this aspect, the configuration of the reference signal resource set is received in a radio resource control, RRC, message. In some embodiments of this aspect, the method further includes determining whether to report channel state information, CSI, from measurements performed on the reference signal resource set to the network node 16 based on the at least one parameter.

Some embodiments of the disclosure include the following:

Embodiment A1. A network node configured to communicate with a wireless device (WD), the network node comprising a radio interface and processing circuitry, the processing circuitry configured to cause the radio interface to send at least one parameter indicating a configuration of a reference signal resource set, the configuration of the reference signal resource set determining whether frequency synchronization can be performed by the wireless device using the reference signal resource set.

Embodiment A2. The network node according to Embodiment A1, wherein the processing circuitry is further configured to cause the radio interface to send the at least one parameter in a radio resource control message.

Embodiment A3. The network node according to any of Embodiments A1 and A2, wherein the reference signal resource set includes a tracking reference signal (TRS) burst.

Embodiment B1. A communication system including a host computer, the host computer comprising:

processing circuitry configured to provide user data; and a communication interface configured to forward the user data to a cellular network for transmission to a wireless device (WD), the cellular network comprising a network node having a radio interface and processing circuitry, the network node's processing circuitry configured to configured to cause the radio interface to send at least one parameter indicating a configuration of a reference signal resource set, the configuration of the reference signal resource set determining whether frequency synchronization can be performed by the wireless device using the reference signal resource set.

Embodiment B2. The communication system of Embodiment B1, further including the network node.

Embodiment B3. The communication system of Embodiment B2, further including the WD, wherein the WD is configured to communicate with the network node.

Embodiment B4. The communication system of Embodiment B3, wherein:

the processing circuitry of the host computer is configured to execute a host application, thereby providing the user data; and the WD comprises processing circuitry configured to execute a client application associated with the host application.

Embodiment C1. A method implemented in a network node configured for communication with a wireless device, the method comprising sending at least one parameter indicating a configuration of a reference signal resource set, the configuration of the reference signal resource set determining whether frequency synchronization can be performed by the wireless device using the reference signal resource set.

Embodiment C2. The method of Embodiment C1, wherein sending the at least one parameter further comprises sending the at least one parameter in a radio resource control message.

Embodiment C3. The method of any of Embodiments C1 and C2, wherein the reference signal resource set includes a tracking reference signal (TRS) burst.

Embodiment D1. A method implemented in a communication system including a host computer, a network node and a wireless device (WD), the method comprising:

at the host computer, providing user data; and at the host computer, initiating a transmission carrying the user data to the WD via a cellular network comprising the network node, the network node configured to send at least one parameter indicating a configuration of a reference signal resource set, the configuration of the reference signal resource set determining whether frequency synchronization can be performed by the wireless device using the reference signal resource set.

Embodiment D2. The method of Embodiment D1, further comprising, at the network node, transmitting the user data.

Embodiment D3. The method of Embodiment D2, wherein the user data is provided at the host computer by executing a host application, the method further comprising, at the WD, executing a client application associated with the host application.

Embodiment E1. A wireless device (WD) configured to communicate with a network node, the WD comprising a radio interface and processing circuitry, the processing circuitry configured to:

cause the radio interface to receive at least one parameter indicating a configuration of a reference signal resource set;

use the at least one parameter to determine the configuration of the reference signal resource set; and based on the determined configuration, determine whether frequency synchronization can be performed using the reference signal resource set.

Embodiment E2. The wireless device according to Embodiment E1, wherein the processing circuitry is further configured to determine that the at least one parameter is present in a radio resource control message.

Embodiment E3. The wireless device according to any of Embodiments E1 and E2, wherein the reference signal resource set includes a tracking reference signal (TRS) burst.

Embodiment E4. The wireless device according to any of Embodiments E1-E3, wherein the processing circuitry is further configured to use the at least one parameter to determine whether to report channel state information (CSI) to the network node.

Embodiment F1. A communication system including a host computer, the host computer comprising:

processing circuitry configured to provide user data; and a communication interface configured to forward user data to a cellular network for transmission to a wireless device (WD), the WD comprising a radio interface and processing circuitry, the WD's processing circuitry configured to:

cause the radio interface to receive at least one parameter indicating a configuration of a reference signal resource set;

use the at least one parameter to determine the configuration of the reference signal resource set; and based on the determined configuration, determine whether frequency synchronization can be performed using the reference signal resource set.

Embodiment F2. The communication system of Embodiment F1, further including the WD.

Embodiment F3. The communication system of Embodiment F2, wherein the cellular network further includes a network node configured to communicate with the WD.

Embodiment F4. The communication system of Embodiment F2 or F3, wherein:

the processing circuitry of the host computer is configured to execute a host application, thereby providing the user data; and the WD's processing circuitry is configured to execute a client application associated with the host application.

Embodiment G1. A method implemented in a wireless device (WD), the method comprising:

receiving at least one parameter indicating a configuration of a reference signal resource set;

using the at least one parameter to determine the configuration of the reference signal resource set; and based on the determined configuration, determining whether frequency synchronization can be performed using the reference signal resource set.

Embodiment G2. The method according to Embodiment G1, further comprising determining that the at least one parameter is present in a radio resource control message.

Embodiment G3. The method according to any of Embodiments G1 and G2, wherein the reference signal resource set includes a tracking reference signal (TRS) burst.

Embodiment G4. The method according to any of Embodiments G1-G3, further comprising using the at least one parameter to determine whether to report channel state information (CSI) to the network node.

Embodiment H1. A method implemented in a communication system including a host computer, a network node and a wireless device (WD), the method comprising:

at the host computer, providing user data; and at the host computer, initiating a transmission carrying the user data to the WD via a cellular network comprising the network node, the WD configured to:

receive at least one parameter indicating a configuration of a reference signal resource set;

use the at least one parameter to determine the configuration of the reference signal resource set; and based on the determined configuration, determine whether frequency synchronization can be performed using the reference signal resource set.

Embodiment H2. The method of Embodiment 35, further comprising, at the WD, receiving the user data from the network node.

Embodiment I1. A network node, comprising:

a memory module configured to store at least one parameter; and a reference signal configuration module configured to send the at least one parameter to indicate to a wireless device (WD) a configuration of a reference signal resource set, the configuration of the reference signal resource set determining whether frequency synchronization can be performed by the WD using the reference signal resource set.

Embodiment 12. A wireless device, comprising:
a memory module configured to store at least one parameter; and
a frequency synchronization determination module configured to:
determine that the at least one parameter indicates a configuration of a reference signal resource set;
use the at least one parameter to determine the configuration of the reference signal resource set; and
based on the determined configuration, determine whether frequency synchronization can be performed using the reference signal resource set.

It has been considered that tracking reference signal (TRS) bandwidths (BWs) be supported in for example, New Radio (NR) with, for example, min(bandwidth part (BWP), ~50 resource blocks (RBs)). In some aspects, the WD is not expected to receive TRS outside the BWP and TRS RB position may be configured by the network node (e.g., gNB).

It has also been considered that TRS can be configured on a carrier or on an active BWP when the synchronization signal (SS) block is not present.

The following have also been considered:
For N=2+2, X=2, TRS symbols have the same symbol positions in the two consecutive slots;
DMRS and TRS are at least Time Division Multiplexed (TDMed) from the WD perspective; and
One of the following symbol positions per slot can be configured by RRC,
Option 1: symbol 4 and 8 (symbol index starts from 0);
Option 2: symbol 5 and 9;
Option 3: symbol 6 and 10;
Note 1: Potential down selection can be done until next meeting. It is not limited to select only one option;
Note 2: RRC signaling to configure TRS as above can be related to the existing RRC signaling for DMRS, CSI-RS, etc.; and
Note 3: It is not precluded to have additional options.

The following has also been considered:
TRS can be configured as one-port CSI-RS resource(s) with the parameters on St, Sf, N, B, X and Y
FFS on one or multiple resources
Note: TRS is also supported in above-6 GHz
FFS on the parameters X, N, St
FFS: TRS periodicity
For below 6 GHz, TRS periodicity 10 ms, 20 ms, 40 ms and 80 ms are supported
For RAN4 information, 10 ms is introduced for high speed train scenario
Note: It is up to the editor to capture the periodicity in units of slots
TRS BW can be equal to BW of BWP
UE is not expected to be simultaneously configured with TRS BW equal to BWP and TRS periodicity of 10 ms if the BWP is larger than 50 RBs
FFS on CSI-RS measurement restriction functionality can be configured between TRS bursts
Sf=4
FFS: Additional Sf values
for below 6 GHz
FFS on X=1

TRS Configuration
It has been considered that TRS can be configured as one-port CSI-RS resource(s) with, for example, the following parameters on St, Sf, N, B, X and Y on one or multiple resources.
Other considerations include:
RPF=4 is a valid frequency density for a single port CSI-RS resource;
A CSI-RS resource can be configured to OFDM symbols 4 and 5 as well;
The group of four single port CSI-RS resources across two adjacent slots can be configured to correspond to a single TRS antenna port; and/or
A partial BW CSI-RS resource may be possible to configure to ~50 RB.

Various CSI-RS resource defining features such as sequence scrambling, measurement restriction configuration, zero power CSI-RS (if supported) may be automatically inherited to TRS without further agreements.

It may be important for estimation of frequency related parameters that the four ports in the four different CSI-RS resources are the same port, i.e. coherence is needed, as discussed herein above. Assuming a quasi-colocation (QCL) relation on e.g., spatial Rx quasi co-location (e.g., using ResourceRep) may be insufficient since that condition only guarantees that the ports are transmitted with the same beam (no phase coherency is guaranteed).

According, this disclosure proposes providing for a "port coherence flag," or other type of configuration indicator, in the resource set configuration to indicate whether the WD may assume that the port in each of the CSI-RS resources is the same port across all resources in the resource set.

This flag may only be present when the CSI-RS resources in the resource set are single port resources. Furthermore, the specification could introduce a new port number for a "TRS antenna port" for easy reference to this new port defined with this resource set.

The RRC configuration of a TRS can be captured as a Resource Set configuration continuing four NZP CSI-RS resources as in the following example:
ResourceConfigList
ResourceSetConfig (S≥1 CSI-RS Resource Sets), containing
Port coherence flag=ON
Indicates whether the port in the CSI-RS resources is the same port across all resources in the resource set
$K_s$=4 NZP-CSI-RS-ResourceConfig, containing
CSI-RS-ResourceConfigId=1, 2, 3, 4
NrofPorts=1
CSI-RS-timeConfig=slot offset={0, 0, 1, 1} respectively, {10, 20, 40, 80} ms
CSI-RS-ResourceMapping, l={4,8} (time mapping example), k={0, 1, 2 or 3} (freq.offset)
CSI-RS-Density=3
CDMType=1
CSI-RS-FreqBand=50 RB or full BWP
Pc=1
ScramblingID={0–($2^{15}$–1)}
ResourceConfigType={periodic}

Note that this may slightly change the definition of the measurement restriction (MR), since if MR is enabled for each of the resources in the resource set that now is a coherent port, then the WD may assume that the MR applies between different such bursts of 4 CSI-RS resources, but not between CSI-RS resources within each burst.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:
CSI-RS Channel state information reference signal
gNB NR Node B (logical network node in NR RAN architecture)
NR New Radio (3GPP 5G)
TSR Tracking reference signal
UE User equipment (logical network node in NR RAN architecture)

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method for a wireless device, WD, configured to communicate with a network node, the method comprising:
receiving a configuration of a channel state information, CSI, reference signal resource set from the network node, the CSI reference signal resource set comprising a plurality of single symbol and single antenna port reference signal resources in at least one slot, the received configuration comprising an indicator indicating that the single antenna port of all of the plurality of reference signal resources in the set are the same;
receiving from the network node reference signal resources in accordance with the configuration of the CSI reference signal resource set; and
based on the indicator, using the received reference signal resources as a set of tracking reference signals.

2. The method according to claim 1, wherein using the received reference signal resources comprises performing frequency synchronization based on the reference signal resources.

3. The method according to claim 2, wherein performing frequency synchronization comprises performing the frequency synchronization based on phase differences between the received reference signal resources.

4. The method according to claim 1, based on the indicator, determining not to perform measurements for a CSI report on the received reference signal resources.

5. The method according to claim 1, wherein the configuration of the CSI reference signal resource set indicates the symbol positions of the plurality of single symbol and single antenna port reference signal resources.

6. A wireless device, WD, configured to communicate with a network node, and further configured to:

receive a configuration of a channel state information, CSI, reference signal resource set from the network node, the CSI reference signal resource set comprising a plurality of single symbol and single antenna port reference signal resources in at least one slot, the received configuration comprising an indicator indicating that the single antenna port of all of the plurality of reference signal resources in the set are the same;

receive from the network node reference signal resources in accordance with the configuration of the CSI reference signal resource set; and based on the indicator, use the received reference signal resources as a set of tracking reference signals.

7. The WD according to claim 6, further configured to use the received reference signal resources by performing frequency synchronization based on the reference signal resources.

8. The WD according to claim 7, further configured to perform frequency synchronization by performing the frequency synchronization based on phase differences between the received reference signal resources.

9. The WD according to claim 6, further configured to, based on the indicator, determine not to perform measurements for a CSI report on the received reference signal resources.

10. The WD according to claim 6, wherein the configuration of the CSI reference signal resource set indicates the symbol positions of the plurality of single symbol and single antenna port reference signal resources.

11. A method for a network node configured to communicate with a wireless device, WD, the method comprising:

transmitting a configuration of a channel state information, CSI, reference signal resource set from the network node, the CSI reference signal resource set comprising a plurality of single symbol and single antenna port reference signal resources in at least one slot, the transmitted configuration comprising an indicator indicating that the single antenna port of all of the plurality of reference signal resources in the set are the same;

transmitting to the WD reference signal resources in accordance with the configuration of the CSI reference signal resource set, enabling use of the reference signal resources as a set of tracking reference signals.

12. The method according to claim 11, wherein transmitting the reference signal resources further enable use of the reference signal resources for performing frequency synchronization.

13. The method according to claim 11, wherein the configuration of the CSI reference signal resource set indicates the symbol positions of the plurality of single symbol and single antenna port reference signal resources.

14. A network node configured to communicate with a wireless device, WD, the network node further configured to:

transmit a configuration of a channel state information, CSI, reference signal resource set from the network node, the CSI reference signal resource set comprising a plurality of single symbol and single antenna port reference signal resources in at least one slot, the transmitted configuration comprising an indicator indicating that the single antenna port of all of the plurality of reference signal resources in the set are the same;

transmit to the WD reference signal resources in accordance with the configuration of the CSI reference signal resource set, enabling use of the reference signal resources as a set of tracking reference signals.

15. The network node according to claim 14, wherein the configuration of the CSI reference signal resource set indicates the symbol positions of the plurality of single symbol and single antenna port reference signal resources.

* * * * *

UNITED STATES PATENT AND TRADEMARK OFFICE
CERTIFICATE OF CORRECTION

PATENT NO. : 11,706,003 B2
APPLICATION NO. : 17/321066
DATED : July 18, 2023
INVENTOR(S) : Björkegren et al.

Page 1 of 1

It is certified that error appears in the above-identified patent and that said Letters Patent is hereby corrected as shown below:

On the Title Page

On Page 2, item (56), under "OTHER PUBLICATIONS", in Column 2, Line 8, delete "pod;" and insert -- port; --, therefor.

In the Specification

In Column 1, Line 11, delete "CONFIGURATION," and insert -- CONFIGURATION", now Pat. No. 11,032,043, --, therefor.

In Column 10, Line 12, delete "mobile management entity (MME)," and insert -- mobility management entity (MME), --, therefor.

In Column 10, Line 29, delete "machine to machine communication (M2M)," and insert -- machine to machine (M2M) communication, --, therefor.

In Column 10, Lines 31-32, delete "laptop embedded equipped (LEE)," and insert -- laptop embedded equipment (LEE), --, therefor.

In Column 28, Line 60, delete "The method of Embodiment 35," and insert -- The method of Embodiment H1, --, therefor.

Signed and Sealed this
Twenty-eighth Day of May, 2024

Katherine Kelly Vidal
*Director of the United States Patent and Trademark Office*